United States Patent
Kim et al.

(10) Patent No.: US 9,184,818 B2
(45) Date of Patent: Nov. 10, 2015

(54) METHOD AND APPARATUS FOR TRANSRECEIVING CHANNEL STATE INFORMATION IN COOPERATIVE MULTIPOINT COMMUNICATION SYSTEM

(71) Applicant: LG ELECTRONICS INC., Seoul (KR)

(72) Inventors: Hyungtae Kim, Anyang-si (KR); Illsoo Sohn, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/346,722

(22) PCT Filed: Oct. 8, 2012

(86) PCT No.: PCT/KR2012/008124
§ 371 (c)(1),
(2) Date: Mar. 22, 2014

(87) PCT Pub. No.: WO2013/051909
PCT Pub. Date: Apr. 11, 2013

(65) Prior Publication Data
US 2014/0226612 A1 Aug. 14, 2014

Related U.S. Application Data

(60) Provisional application No. 61/544,289, filed on Oct. 7, 2011, provisional application No. 61/546,048, filed on Oct. 11, 2011, provisional application No. 61/610,998, filed on Mar. 14, 2012.

(51) Int. Cl.
*H04B 7/04* (2006.01)
*H04B 7/02* (2006.01)
(Continued)

(52) U.S. Cl.
CPC .............. *H04B 7/0486* (2013.01); *H04B 7/024* (2013.01); *H04B 7/0417* (2013.01);
(Continued)

(58) Field of Classification Search
CPC .... H04B 7/0486; H04B 7/024; H04B 7/0417; H04B 7/0632; H04B 7/063; H04B 7/0639; H04W 24/10; H04L 5/0057; H04L 25/0228; H04L 5/0051
USPC ................ 370/241, 252, 310, 328, 329, 338; 455/403, 422.1, 7, 24
See application file for complete search history.

(56) References Cited

U.S. PATENT DOCUMENTS

2011/0206154 A1* 8/2011 Ding et al. ................... 375/267
2011/0249578 A1* 10/2011 Nayeb Nazar et al. ....... 370/252
(Continued)

OTHER PUBLICATIONS

Huawei, "Feedback Design Principles for Downlink CoMP", 3GPP TSG RAN WG1 meeting #57bis, USA, Jun. 29-Jul. 3, 2009, 4 pages, R1-092369.
(Continued)

*Primary Examiner* — Obaidul Huq
(74) *Attorney, Agent, or Firm* — Birch, Stewart, Kolasch & Birch, LLP

(57) ABSTRACT

The present invention relates to a method and apparatus for transmitting channel state information in a cooperative multipoint communication system. A method for a terminal transmitting the channel state information (CSI) to multiple base stations according to one embodiment includes receiving a first piece of CSI setting information with respect to reporting of CSI including at least one of a rank indicator (RI), a precoding matrix indicator (PMI), and a channel quality indicator (CQI), with respect to a first base station; receiving a second piece of CSI setting information with respect to reporting of CSI including at least one of an RI, a PMI, and a CQI, with respect to a second base station; and transmitting the CSI with respect to the first base station and the second base station on the basis of the CSI setting information on the first and second base stations.

13 Claims, 22 Drawing Sheets serving eNB

RI/W1/W2/CQI with respect to serving eNB
RI / W1 / W2 / CQI

RI/W1/W2/CQI with respect to neighboring eNB
RI / W1 / W2 / CQI

UE

(51) Int. Cl.
*H04W 24/10* (2009.01)
*H04B 7/06* (2006.01)
*H04L 5/00* (2006.01)
*H04L 25/02* (2006.01)
*H04J 11/00* (2006.01)

(52) U.S. Cl.
CPC ............ *H04L 5/0057* (2013.01); *H04W 24/10* (2013.01); *H04B 7/063* (2013.01); *H04B 7/0632* (2013.01); *H04B 7/0639* (2013.01); *H04J 11/0053* (2013.01); *H04L 5/0051* (2013.01); *H04L 25/0228* (2013.01)

(56) References Cited

U.S. PATENT DOCUMENTS

| | | | |
|---|---|---|---|
| 2012/0113816 A1* | 5/2012 | Bhattad et al. | 370/246 |
| 2012/0220286 A1* | 8/2012 | Chen et al. | 455/422.1 |
| 2012/0275313 A1* | 11/2012 | Prasad et al. | 370/241 |
| 2014/0355529 A1* | 12/2014 | Zhu et al. | 370/329 |

OTHER PUBLICATIONS

Qualcomm Europe, "CoMP email summary", 3GPP TSG RAN WG1 #57bis, USA, Jun. 29-Jun. 2, 2009, 5 pages, R1-092946.

ZTE, "Consideration on downlink control signaling configuration for CoMP", 3GPP TSG RAN WG1 Meeting #66bis, Zhuhai, China, Oct. 10-14, 2011, 5 pages, R1-113015.

* cited by examiner (a)

(b)

(a)

(b)

METHOD AND APPARATUS FOR TRANSRECEIVING CHANNEL STATE INFORMATION IN COOPERATIVE MULTIPOINT COMMUNICATION SYSTEM

This application is the National Phase of PCT/KR2012/008124 filed on Oct. 8, 2012, which claims priority under 35 U.S.C. 19(e) to U.S. Provisional Application Nos. 61/544,289 filed on Oct. 7, 2011, 61/546,048 filed on Oct. 11, 2011 and 61/610,998 filed on Mar. 14, 2012, all which are hereby expressly by reference into the present application.

TECHNICAL FIELD

The present invention relates to wireless communication, and more particularly, to a method and apparatus for transmitting and receiving channel state information in a cooperative multipoint communication system.

BACKGROUND ART

Multi-Input Multi-Output (MIMO) technology is to improve efficiency in data transmission and reception by using multiple transmitting antennas and multiple receiving antennas instead of a single transmitting antenna and a single receiving antenna. If a single antenna is used, a receiving side receives data through a single antenna path. However, if multiple antennas are used, the receiving side receives data through various paths. Accordingly, speed and amount in data transmission may be increased, and coverage may be increased.

A single-cell MIMO operation may be divided into a single user-MIMO (SU-MIMO) scheme, in which one user equipment receives a downlink signal from one cell, and a multi user-MIMO (MU-MIMO) scheme, in which two or more user equipments receive a downlink signal from one cell.

In the meantime, a coordinated multi-point (CoMP) system for improving throughput of a user located at the cell edge by applying improved MIMO transmission under the multi-cell environment has been actively studied. If the CoMP system is applied, inter-cell interference may be reduced under the multi-cell environment, and system throughput may be improved.

DISCLOSURE

Technical Problem

In order to desirably perform a CoMP operation, a user equipment operated under the multi-cell environment needs to feed channel state information (CSI) on a serving cell and CSI on a neighboring cell, which joins in the CoMP operation, back. At this time, if a CSI feedback method for a single cell according to the related art is applied, a problem occurs in that feedback overhead is increased as the number of cells which should feed CSI back is increased.

An object of the present invention devised to solve the conventional problem is to provide a method and apparatus for efficiently feeding CSI back from a system that supports a CoMP operation.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the conventional problem, in one aspect of the present invention, a method for enabling a user equipment to transmit channel state information (CSI) on multiple base stations in a wireless communication system comprises the steps of receiving first CSI configuration information on report of CSI, which includes at least one of a rank indicator (RI), precoding matrix indicator (PMI) and channel quality indicator (CQI) of a first base station; receiving second CSI configuration information on report of CSI, which includes at least one of an RI, PMI and CQI of a second base station; and transmitting CSI on the first base station and CSI on the second base station on the basis of the first CSI configuration information and the second CSI configuration information, wherein a parameter of some or all of the second CSI configuration information is set to a value equal to a parameter corresponding to the first CSI configuration information.

In another aspect of the present invention, a method for enabling a first base station to support coordinated multi point (CoMP) communication comprises the steps of transmitting first CSI configuration information on report of CSI, which includes at least one of a rank indicator (RI), precoding matrix indicator (PMI) and channel quality indicator (CQI) of the first base station, to a user equipment; transmitting second CSI configuration information on report of CSI, which includes at least one of an RI, PMI and CQI of a second base station, to the user equipment; and receiving CSI on the first base station and CSI on the second base station on the basis of the first CSI configuration information and the second CSI configuration information from the user equipment, wherein a parameter of some or all of the second CSI configuration information is set to a value equal to a parameter corresponding to the first CSI configuration information.

In still another aspect of the present invention, a user equipment for transmitting channel state information (CSI) on multiple base stations comprises a reception module configured to receive a downlink signal from a first base station and a second base station; a transmission module configured to transmit an uplink signal to the first base station and the second base station; and a processor configured to control the user equipment, which includes the reception module and transmission module, wherein the processor receives first CSI configuration information on report of CSI, which includes at least one of a rank indicator (RI), precoding matrix indicator (PMI) and channel quality indicator (CQI) of the first base station, through the reception module, receives second CSI configuration information on report of CSI, which includes at least one of an RI, PMI and CQI of the second base station, through the reception module, and transmits CSI on the first base station and CSI on the second base station on the basis of the first CSI configuration information and the second CSI configuration information, through the transmission module, and a parameter of some or all of the second CSI configuration information is set to a value equal to a parameter corresponding to the first CSI configuration information.

In further still another aspect of the present invention, a first base station for supporting CoMP communication comprises a reception module configured to receive an uplink signal from a user equipment and receive information between base stations from a second base station; a transmission module configured to transmit a downlink signal to the user equipment and transmit information between the base stations to the second base station; and a processor configured to control the first base station, which includes the reception module and transmission module, wherein the processor transmits first CSI configuration information on report of CSI, which includes at least one of a rank indicator (RI), precoding matrix indicator (PMI) and channel quality indicator (CQI) of the first base station, through the transmission module, transmits second CSI configuration information on report of CSI, which includes at least one of an RI, PMI and CQI of a second base station, through the transmission module, and receives CSI on the first base station and CSI on the second base station on the basis of the first CSI configuration information and the second CSI configuration information through the reception module, wherein a parameter of some or all of the second CSI configuration information is set to a value equal to a parameter corresponding to the first CSI configuration information.

The followings may commonly be applied to the above aspects of the present invention.

The parameter set to the value equal to the parameter corresponding to the first CSI configuration information may be omitted from the second CSI configuration information.

The parameter set to the value equal to the parameter corresponding to the first CSI configuration information may be a CSI report period.

The step of transmitting CSI may include alternately transmitting the CSI on the first base station and the CSI on the second base station.

A transmission time based on periodic report of the CSI on the first base station and a transmission time based on periodic report of the CSI on the second base station may be set by continuous subframes.

The step of transmitting CSI may include changing the transmission order of the CSI on the first base station and the CSI on the second base station within the subframe every predetermined subframe group.

If the parameter set to the value equal to the parameter corresponding to the first CSI configuration information is CSI report period and offset of the second base station, the CSI on the first base station and the CSI on the second base station may be transmitted through one uplink container.

The step of transmitting CSI may include transmitting CSI on the first base station and CSI on the second base station through a physical uplink control channel (PUCCH) if the RI and PMI of the first base station and the second base station is omitted, and transmitting the CSI on the first base station and CSI on the second base station through a physical uplink shared channel (PUSCH) if not so.

Each of the first CSI configuration information and the second CSI configuration information may include one or more of a CSI report period, offset, subband CSI report period setting parameter, uplink resources used for CSI report, and CSI report mode.

The first base station may be a serving base station, and the second base station may be a neighboring base station that may join in coordinated multi point (CoMP) operation.

The CSI on the first base station may be transmitted to the first base station, and the CSI on the second base station may be transmitted to any one of the first base station and the second base station.

The aforementioned description of the present invention and its detailed description, which will be made later, are only exemplary, and are intended for additional description of claims.

Advantageous Effects

According to the present invention, the method and apparatus for efficiently feeding CSI back in a system that supports a CoMP operation may be provided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
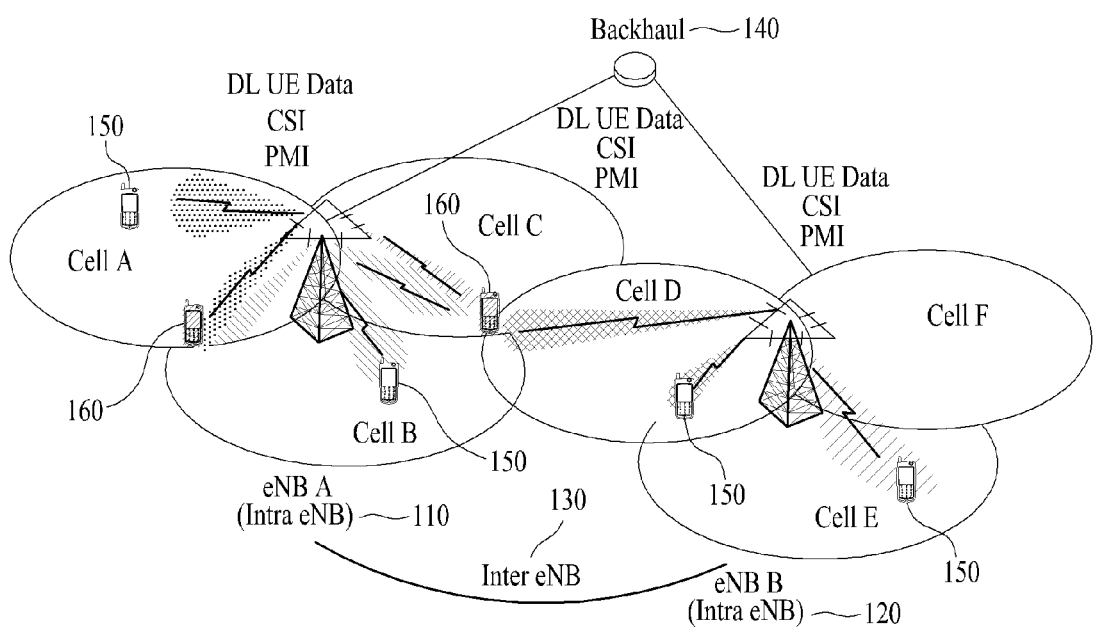
FIG. 1 is a conceptional diagram illustrating a CoMP system of intra eNBs and an inter eNB.
Figure 1:
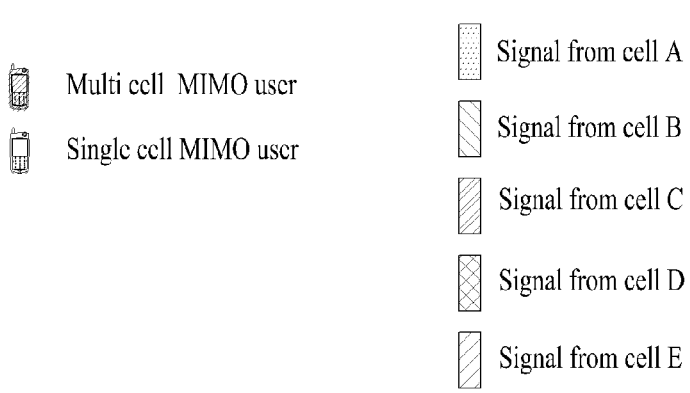

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station and a user equipment. In this case, the base station means a terminal node of a network, which performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station may be performed by the base station BS or network nodes other than the base station. The base station BS may be replaced with terms such as a fixed station, Node B, eNode B (eNB), and an access point (AP). Also, in the following description, the terminology 'base station' may be used as a concept that includes a cell or sector. For example, in the present invention, a serving base station may be referred to as a serving cell, and a cooperative base station may be referred to as a cooperative cell. Also, the user equipment UE may be replaced with terms such as a terminal, a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

A coordinated multi-point (CoMP) system will be described with reference to FIG. 1. FIG. 1 is a conceptional diagram illustrating a CoMP system of intra eNBs and an inter eNB.

In accordance with requirements of improved system throughput of the 3GPP LTE-A system, the CoMP transmission and reception technology (referred to as co-MIMO, collaborative MIMO or network MIMO) has been suggested. The CoMP technology may increase throughput of the user equipment located at the cell edge and increase average sector throughput.

Generally, in a multi-cell environment where a frequency reuse factor is 1, throughput of the user equipment located at the cell edge and average sector throughput may be reduced due to inter-cell interference (ICI). In order to reduce ICI, a method for enabling a user equipment located at the cell edge in an environment restricted by interference to have proper throughput by using a simple passive scheme such as fractional frequency reuse (FFR) through user equipment specific power control has been applied to the LTE system according to the related art. However, it may be more preferable to reduce ICI or allow the user equipment to reuse ICI as a desired signal than reduce use of frequency resources per cell. To this end, a CoMP transmission scheme may be used.

Referring to FIG. 1, intra base stations 110, 120 and inter base station 130 exist under a multi cell environment.

In the LTE system, the intra base stations include several cells (or sectors). Cells that belong to a base station to which a specific user equipment belongs are the relation of intra base stations 110, 120 with the specific user equipment. Namely, cells that share a base station to which a user equipment belongs are cells corresponding to the intra base stations 110 and 120 while cells that belong to other base stations are cells corresponding to the inter base station 130. In this way, although cells (that is, intra base stations) based on the same base station as that of a specific user equipment may transmit and receive information (for example, data, channel state information (CSI)) without separate interface between schedulers of the respective cells, cells (that is, inter base stations)

based on a base station different from that of a specific user equipment may transmit and receive information through a backhaul 140.

As illustrated in FIG. 1, a single cell MIMO user 150 located within a single cell may perform communication with a single serving base station in one cell (cell A, cell B, cell D or cell E), and a multi-cell MIMO user 160 located at the cell edge may perform communication with a plurality of serving base stations in multiple cells (cells A and B or cells B, C and D.

A CoMP scheme that may be applied in case of a downlink may be classified into a joint-processing (JP) scheme and a coordinated scheduling/beamforming (CS/CB) scheme.

According to the JP scheme, each point (base station) of CoMP cooperative unit may use data. The CoMP cooperative unit means a set of base stations used for a cooperative transmission scheme. The JP scheme may be classified into a joint transmission scheme and a dynamic cell selection scheme.

The joint transmission scheme means that a PDSCH is transmitted from a plurality of points (some or all of CoMP cooperative unit) at one time. In other words, data transmitted to a single user equipment may be transmitted from a plurality of transmission points at the same time. According to the joint transmission scheme, quality of a received signal may be improved coherently or non-coherently, and interference on another user equipment may be removed actively.

The dynamic cell selection scheme means that a PDSCH is transmitted from one point (of CoMP cooperative unit) at one time. In other words, data transmitted to a single user equipment at a specific time are transmitted from one point. Another point within the cooperative unit may not perform data transmission to the corresponding user equipment at the specific time, and the point which transmits data to the corresponding user equipment may be selected dynamically.

In the meantime, according to the CS/CB scheme, CoMP cooperative units may cooperatively perform beamforming of data transmission to a single user equipment. In this case, although the data are transmitted from a serving cell only, user scheduling/beamforming may be determined by coordination of the cells of the corresponding cooperative unit.

In the meantime, in case of an uplink, coordinated multi-point reception means that a signal is received by coordination of a plurality of points locally spaced apart from one another. A CoMP scheme that may be applied in case of the uplink may be classified into a joint reception (JR) scheme and a coordinated scheduling/beamforming (CS/CB) scheme.

The JR scheme means that a signal transmitted through a PUSCH is received from a plurality of reception points. The CS/CB scheme means that a PUSCH is received from one point only but user scheduling/beamforming is determined by coordination of cells of CoMP cooperative unit.

Figure 2:
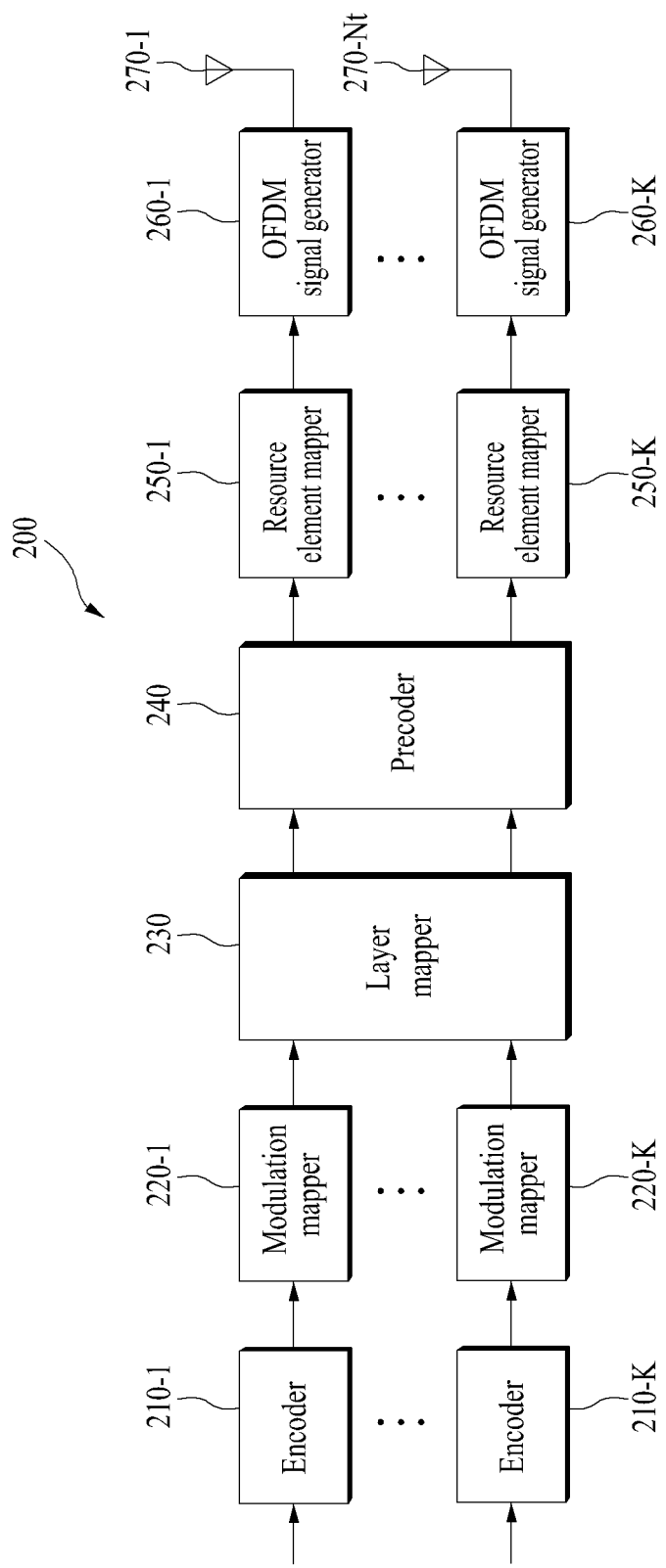
FIG. 2 is a block diagram illustrating a structure of a transmitting side having multiple antennas.

FIG. 2 is a block diagram illustrating a structure of a transmitting side provided with multiple antennas.

Referring to FIG. 2, the transmitter 200 includes encoders 210-1 to 210-K, modulation mappers 220-1 to 220-K, a layer mapper 230, a precoder 240, resource element mappers 250-1 to 250-K, and OFDM signal generators 260-1 to 260-K. The transmitter 200 includes Nt number of transmitting antennas 270-1 to 270-Nt.

The encoders 210-1 to 210-K form coded data by encoding input data in accordance with a given coding scheme. The modulation mappers 220-1 to 220-K map the coded data into modulation symbols representing a position on signal constellation. There is no limitation in a modulation scheme, and an example of the modulation scheme may include m-phase shift keying (m-PSK) or m-quadrature amplitude modulation (m-QAM). For example, m-PSK may be BPSK, QPSK or 8-PSK, and m-QAM may be 16-QAM, 64-QAM, or 256-QAM.

The layer mapper 230 defines a layer of the modulation symbols so that the precoder 240 may distribute antenna-specific symbols into a path of each antenna. The layer is defined by an information path input to the precoder 240. An information path prior to the precoder 240 may be referred to as a virtual antenna or layer.

The precoder 240 processes the modulation symbols in accordance with a MIMO scheme based on the multiple transmitting antennas 270-1 to 270-Nt and outputs the antenna-specific symbols. The precoder 240 distributes the antenna-specific symbols into the resource element mappers 250-1 to 250-K of a path of the corresponding antenna. Each information path sent to one antenna by the precoder 240 may be referred to as a stream. This may be referred to as a physical antenna.

The resource element mappers 250-1 to 250-K allocate the antenna-specific symbols to a proper resource element, and multiplex them in accordance with users. The OFDM signal generators 260-1 to 260-K modulate the antenna-specific symbols in accordance with the OFDM scheme and output OFDM symbols. The OFDM signal generators 260-1 to 260-K may perform inverse fast fourier transform (IFFT) for the antenna-specific symbols, and cyclic prefix (CP) may be prefixed to a time domain symbol where IFFT has been performed. The CP is a signal inserted to a guard interval to remove inter-symbol interference based on multi-path in an OFDM transmission scheme. The OFDM symbols are transmitted through each of the transmitting antennas 270-1 to 270-Nt.

A structure of a downlink radio frame will be described with reference to FIG. 3 and FIG. 4.

In a cellular OFDM wireless packet communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

Figure 3:
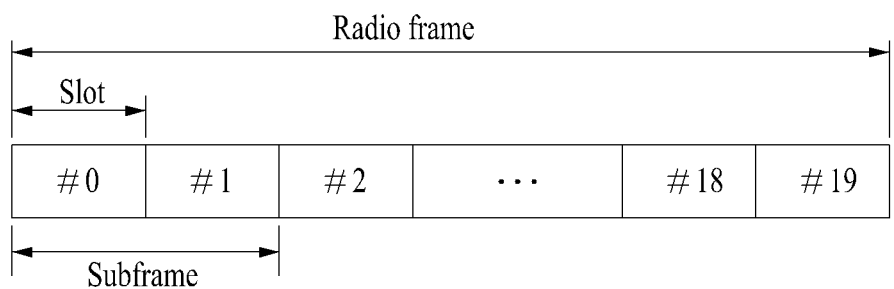
FIG. 3 is a diagram illustrating a structure of a type 1 radio frame.

FIG. 3 is a diagram illustrating a structure of a type 1 radio frame. The downlink radio frame includes 10 subframes, each of which includes two slots. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain.

The number of OFDM symbols included in one slot may be varied depending on configuration of CP. Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. In case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

Figure 4:
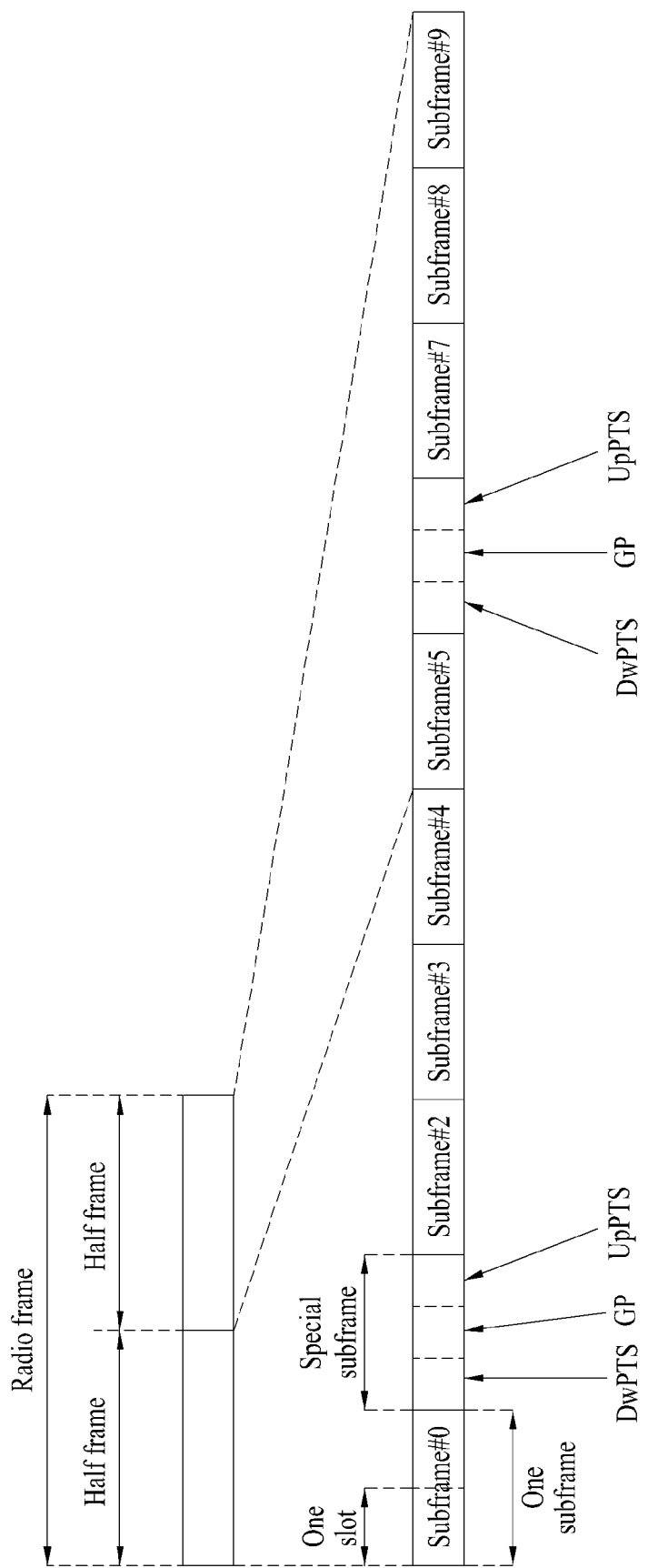
FIG. 4 is a diagram illustrating a structure of a type 2 radio frame.

FIG. 4 is a diagram illustrating a structure of a type 2 radio frame. The type 2 radio frame includes two half frames, each of which includes five subframes. The subframes may be divided into normal subframes and special subframes. The special subframes include three fields of a downlink pilot time slot (DwPTS), a guard period (GP), and an uplink pilot time slot (UpPTS). Although a length of these three fields may be set respectively, the entire length of the three fields should be 1 ms. One subframe includes two slots. Namely, one subframe includes two slots regardless of a type of the radio frame.

The structure of the radio frame is only exemplary, and various modifications may be made in the number of subframes included in the radio frame, the number of slots included in the subframe, or the number of symbols included in the slot.

Figure 5:
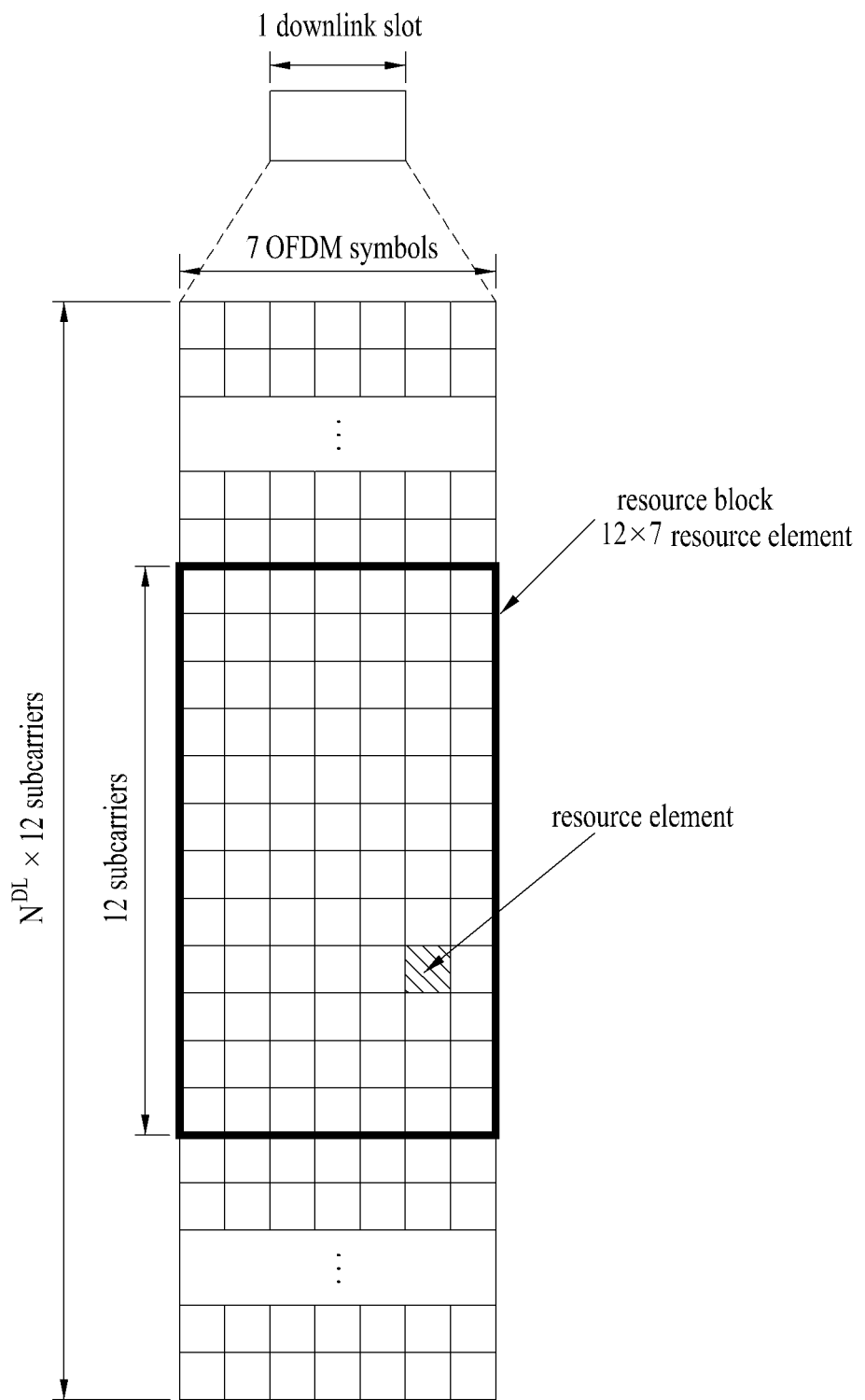
FIG. 5 is a diagram illustrating an example of a resource grid of one downlink slot.

FIG. 5 is a diagram illustrating an example of a resource grid of one downlink slot. In this case, OFDM symbols are configured by the normal CP. Referring to FIG. 5, the downlink slot includes a plurality of OFDM symbols in a time domain and a plurality of resource blocks in a frequency domain. In this case, one downlink slot includes, but not limited to, seven OFDM symbols, and one resource block includes, but not limited to, twelve subcarriers. Each element on the resource grid will be referred to as a resource element (RE). For example, a resource element 'a' (k, 1) becomes the resource element located at the kth subcarrier and the first OFDM symbol. In case of the normal CP, one resource block includes 12×7 resource elements (in case of the extended CP, one resource block includes 12×6 resource elements). Since the interval between the respective subcarriers is 15 kHz, one resource block includes about 180 kHz in the frequency domain. $N^{DL}$ is the number of resource blocks included in the downlink slot, and its value may be determined depending on a downlink transmission bandwidth set by scheduling of the base station.

Figure 6:
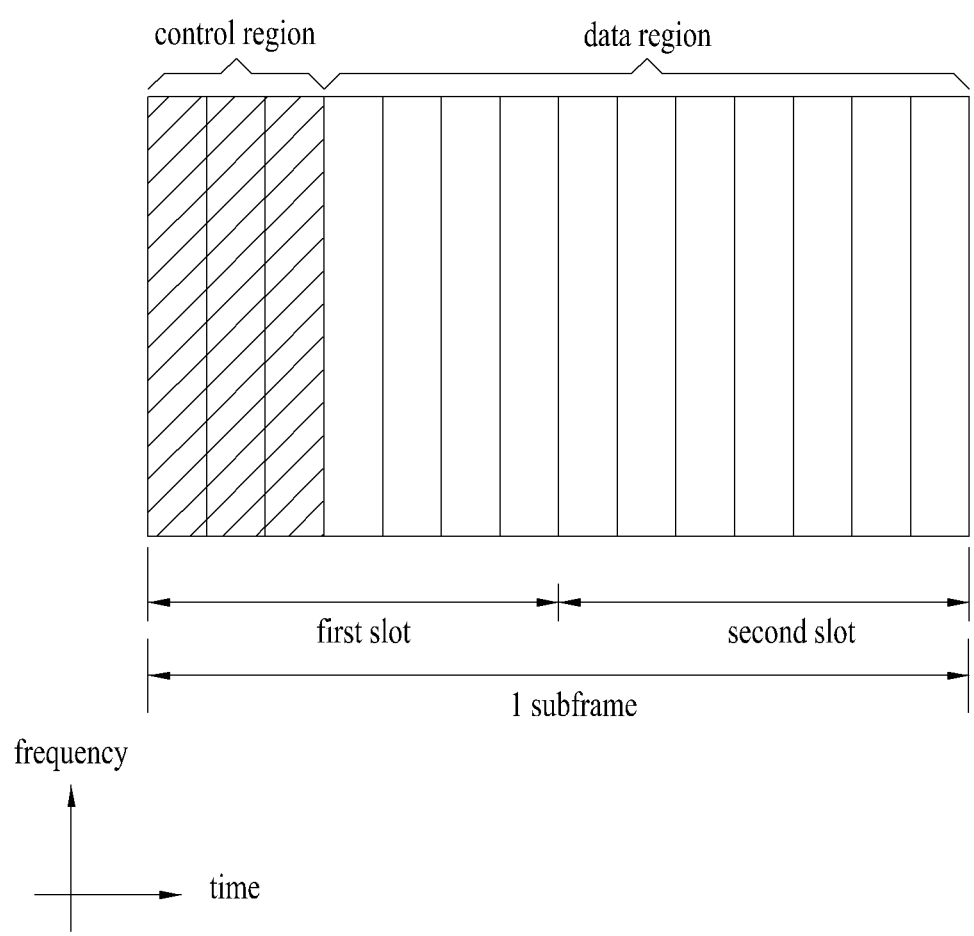
FIG. 6 is a diagram illustrating a structure of a downlink subframe.

FIG. 6 is a diagram illustrating a structure of a downlink subframe. Maximum three (one, two or three) OFDM symbols located at the front of the first slot within one subframe correspond to a control region to which a control channel is allocated. The other OFDM symbols correspond to a data region to which a physical downlink shared channel (PDSCH) is allocated. A basic unit of transmission is one subframe. In other words, a PDCCH and a PDSCH are allocated to two slots. Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and includes information on the number of OFDM symbols used for transmission of the control channel within the subframe. The PHICH includes HARQ ACK/NACK (acknowledgement/negative-acknowledgement) signals in response to uplink transmission. The control information transmitted through the PDCCH will be referred to as downlink control information (DCI). The DCI includes uplink or downlink scheduling information, or uplink transmission (Tx) power control command for a random user equipment group. The PDCCH may include transport format and resource allocation information of a downlink shared channel (DL-SCH), resource allocation information of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a random user equipment group, transmission power control information, and activity information of voice over Internet protocol (VoIP). A plurality of PDCCHs may be transmitted within the control region. The user equipment may monitor the plurality of PDCCHs. The PDCCH is transmitted by aggregation of one or a plurality of continuous control channel elements (CCEs). The CCE is a logic allocation unit used to provide the PDCCH at a coding rate based on the status of a radio channel. The CCE corresponds to a plurality of resource element groups (REGs). The format of the PDCCH and the number of available bits of the PDCCH are determined depending on the correlation between the number of CCEs and a coding rate provided by the CCE. The base station determines a PDCCH format depending on the DCI transmitted to the user equipment, and attaches cyclic redundancy check (CRC) to the control information. The CRC is masked with an identifier (for example, radio network temporary identifier (RNTI)) depending on usage of the PDCCH or owner of the PDCCH. If the PDCCH is for a specific user equipment, cell-RNTI (C-RNTI) of the corresponding user equipment may be masked with the CRC. If the PDCCH is for a paging message, a paging indicator identifier (P-RNTI) may be masked with the CRC. If the PDCCH is for system information (in more detail, system information block (SIB)), system information identifier and system information RNTI (SI-RNTI) may be masked with the CRC. In order to represent a random access response which is the response to transmission of random access preamble of the user equipment, a random access RNTI (RA-RNTI) may be masked with the CRC.

Figure 7:
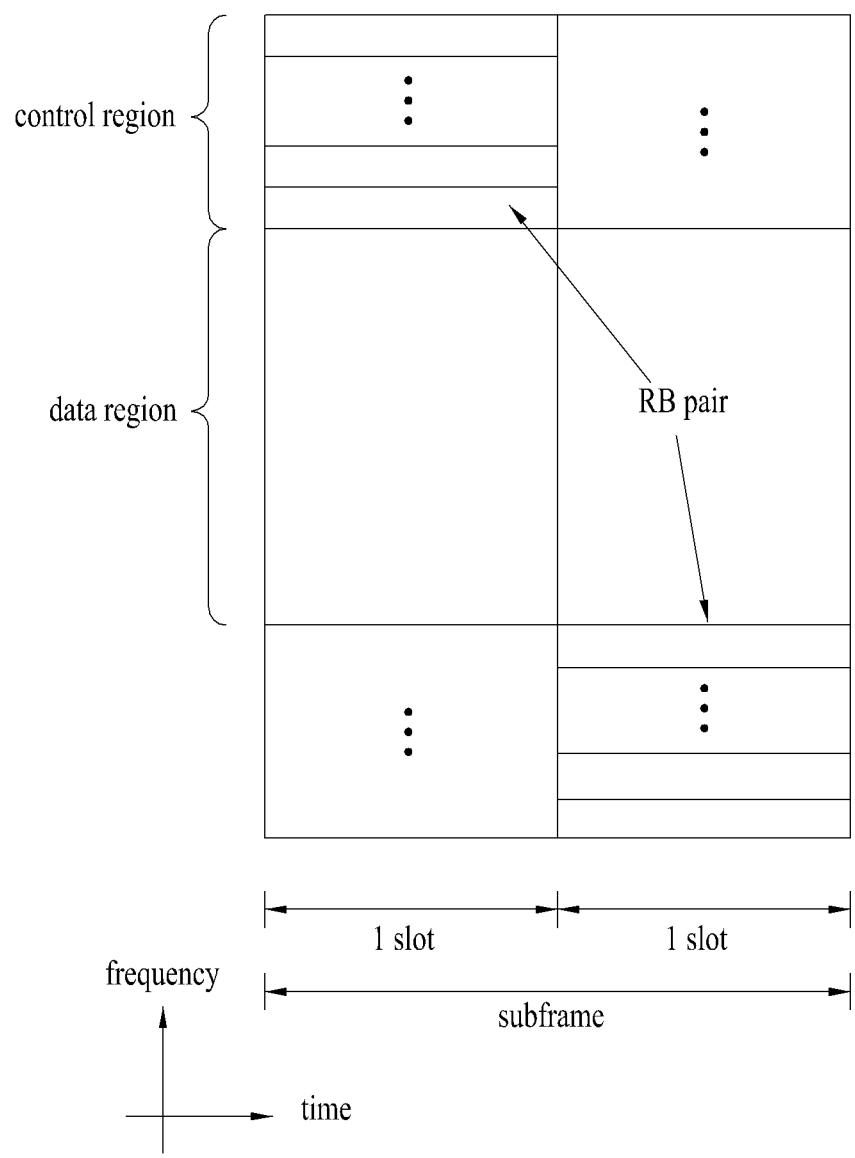
FIG. 7 is a diagram illustrating a structure of an uplink subframe.

FIG. 7 is a diagram illustrating a structure of an uplink subframe. The uplink subframe may be divided into a control region and a data region on a frequency domain. A physical uplink control channel (PUCCH) for carrying uplink control information is allocated to the control region. A physical uplink shared channel (PUSCH) for carrying user data is allocated to the data region. The PUCCH may be used for ACK/NACK transmission of the PDSCH, transmission of a channel quality indicator (CQI) for frequency domain scheduling of the PDSCH, and a request of PUSCH transmission resource (scheduling request). CQI information bits may include one or more fields. For example, a CQI field indicating CQI index that determines a modulation and coding scheme (MCS), a precoding matrix indicator (PMI) field indicating index of a precoding matrix on a code book, and a rank indicator (RI) field indicating rank may be included in the CQI information bits.

The PUCCH for one user equipment is allocated to a pair of RBs at the subframe. Resource blocks belonging to the pair of RBs occupy different subcarriers for two slots. The pair of RBs allocated to the PUCCH are subjected to frequency hopping at the boundary of the slots.

MIMO System

Figure 8:
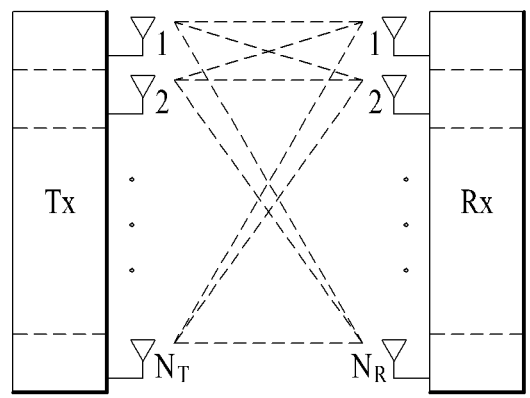
FIG. 8 is a diagram illustrating a configuration of a wireless communication system having multiple antennas.
Figure 8:
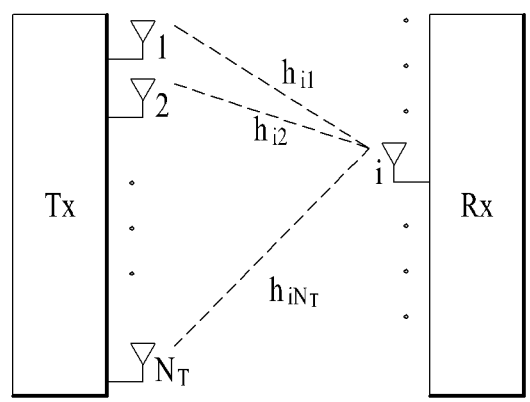

FIG. 8 is a schematic view illustrating a wireless communication system provided with multiple antennas. As shown in FIG. 8(a), if the number of transmitting antennas increases to $N_T$ and the number of receiving antennas increases to $N_R$, channel transmission capacity increases theoretically in proportion to the number of antennas unlike that a plurality of antennas are used in only a transmitter or a receiver. Accordingly, it is possible to improve a transmission rate and remarkably improve frequency efficiency. A transmission rate based on increase of channel transmission capacity may increase theoretically as much as a value obtained by multiplying a maximum transmission rate $R_0$, which corresponds to a case where one antenna is used, by an increase rate $R_i$, as follows.

$$R_i = \min(N_T, N_R) \quad \text{[Equation 1]}$$

For example, in a MIMO communication system that uses four transmitting antennas and four receiving antennas, a transmission rate theoretically four times greater than that of a single antenna system may be obtained. After theoretical capacity increase of the MIMO system has been proved in the middle of 1990, various technologies have been actively studied to substantially improve a data transmission rate. Some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and modeling of a MIMO system, and the study of time space signal processing technology for improvement of transmission reliability and transmission rate.

A communication method in a MIMO system will be described in more detail with reference to mathematical modeling. In the MIMO system, it is assumed that $N_T$ transmitting antennas and $N_R$ receiving antennas exist. First of all, a transmitting signal will be described. If there exist $N_T$ transmitting antennas, the number of maximum transmission information is $N_T$. The transmission information may be expressed as follows.

$$s = [s_1, s_2, \ldots, s_{N_T}]^T \quad \text{[Equation 2]}$$

Different kinds of transmission power may be applied to each of the transmission information $s_1, s_2, \ldots, s_{N_T}$. At this time, supposing that each transmission power is $P_1, P_2, \ldots, P_{N_T}$, transmission information of which transmission power is controlled may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, $\hat{s}$ may be expressed as follows using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

It is considered that a weight matrix W is applied to the information vector $\hat{s}$ of which transmission power is controlled, so as to obtain $N_T$ transmitting signals $x_1, x_2, \ldots, x_{N_T}$. In this case, the weight matrix W serves to properly distribute the transmission information to each antenna. Such transmitting signals $x_1, x_2, \ldots, x_{N_T}$ may be expressed as follows using a vector X.

$$X = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In this case, $W_{ij}$ means a weight value between the ith transmitting antenna and the jth information. W may be referred to as a precoding matrix.

If there exist $N_R$ receiving antennas, receiving signals $y_1, y_2, \ldots, y_{N_R}$ of the respective antennas may be expressed by a vector as follows.

$$y = [y_1, y_2, \ldots, Y_{N_R}]^T \quad \text{[Equation 6]}$$

In case of channel modeling in the MIMO communication system, channels may be classified depending on indexes of transmitting and receiving antennas. In this case, a channel that passes from the jth transmitting antenna to the ith receiving antenna will be expressed as $h_{ij}$. It is noted that index of the receiving antenna is prior to index of the transmitting antenna in index of $h_{ij}$.

FIG. 8(b) illustrates channels from $N_T$ transmitting antennas from the receiving antenna i. Several channels may be grouped into one and then may be expressed by a vector type or a matrix type. As shown in FIG. 8(b), the channels from $N_T$ transmitting antennas to the ith receiving antenna may be expressed as follows.

$$h_i^T = [h_{i1}, h_{i2}, \ldots, h_{iN_T}] \quad \text{[Equation 7]}$$

Accordingly, all channels from $N_T$ transmitting antennas to $N_R$ receiving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

Since additive white Gaussian noise (AWGN) is actually added to the channels after the above channel matrix H. AWGN $n_1, n_2, \ldots, n_{N_R}$ added to each of the $N_R$ receiving antennas may be expressed as follows.

$$n = [n_1, n_2, \ldots n_{N_R}]^T \quad \text{[Equation 9]}$$

The receiving signals obtained using the above equation modeling may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the meantime, the number of rows and columns of the channel matrix H indicating the channel state is determined by the number of transmitting antennas and the number of receiving antennas. The number of rows in the channel matrix H is the same as the number $N_R$ of receiving antennas, and the number of columns is the same as the number $N_T$ of transmitting antennas. In other words, the channel matrix H may be expressed by $N_R \times N_T$ matrix.

A rank of the matrix is defined by a minimum number of the number of rows and the number of columns, which are independent from each other. Therefore, the rank of the matrix cannot have a value greater than the number of rows or the number of columns. Rank (rank(H)) of the channel matrix H may be limited as follows.

$$\text{rank}(H) \leq \min(N_T, N_R) \quad \text{[Equation 11]}$$

The rank may also be defined by the number of eigen values not 0 when eigen value decomposition is performed for the matrix. Similarly, the rank may be defined by the number of singular values not 0 when singular value decomposition (SVD) is performed for the matrix. Accordingly, in the channel matrix, the rank may physically mean a maximum number of columns or rows that may transmit different kinds of information from a given channel.

In this specification, 'Rank' for MIMO transmission represents the number of paths that may transmit a signal independently at a specific time and a specific frequency resource, and 'the number of layers' represents the number of signal streams transmitted through each path. Generally, since the transmitting side transmits layers corresponding to the number of ranks, the ranks are the same as the number of layers unless mentioned otherwise.

Reference Signal (RS)

In the wireless communication system, since a packet is transmitted through a radio channel, signal distortion may occur during transmission of the packet. In order to normally receive the distorted signal, distortion of the received signal should be compensated using channel information. In order to discover the channel information, it is required to transmit the signal known by both a transmitting side and a receiving side and discover the channel information using a distortion level of the signal when the signal is transmitted through the channel. In this case, the signal known by both the transmitting side and the receiving side will be referred to as a pilot signal or a reference signal.

In case that multiple antennas are used to transmit and receive data, a channel state between each transmitting antenna and each receiving antenna should be known to receive a normal signal. Accordingly, a separate reference signal per transmitting antenna should be provided.

Examples of downlink reference signals include a common reference signal (CRS) shared by all the user equipments within the cell and a dedicated reference signal (DRS) for a specific user equipment only. Information on channel estimation and demodulation may be provided by these reference signals.

The receiving side (user equipment) may feed an indicator related channel quality, such as a channel quality indicator (CQI), a precoding matrix index (PMI) and/or a rank indicator (RI), back to the transmitting side (base station) by estimating the channel state from the CRS. The CRS may be referred to as a cell-specific reference signal. Alternatively, the RS related to feedback of the channel state information (CSI) such as CQI/PMI/RI may be defined as CSI-RS separately.

In the meantime, the DRS may be transmitted through the corresponding resource element (RE) if demodulation is required for data on the PDSCH. The user equipment may be indicated from its upper layer as to the presence of the DRS, and may be indicated that the DRS is useful only if the corresponding PDSCH is mapped. The DRS may be referred to as a user equipment-specific (UE-specific) reference signal or a demodulation reference signal (DMRS).

Figure 9:
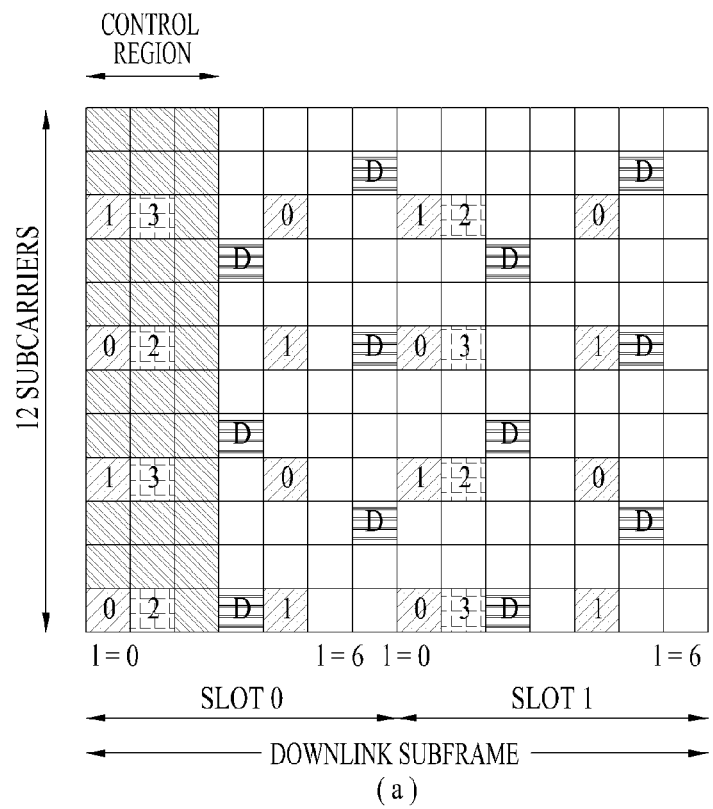
FIG. 9 is a diagram illustrating a reference signal pattern defined in an LTE system according to the related art.
Figure 9:
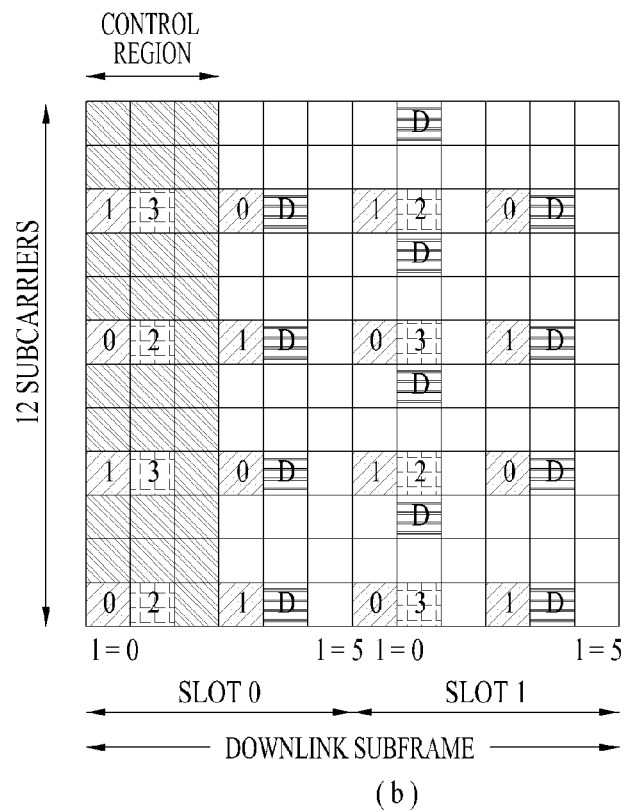

FIG. 9 is a diagram illustrating a mapping pattern of a CRS and a DRS defined in the 3GPP LTE system (for example, release-8) of the related art on a downlink resource block. The downlink resource block as a mapping unit of the reference signal may be expressed by a unit of one subframe on time X twelve subcarriers on frequency. In other words, one resource block has a length of 14 OFDM symbols in case of the normal CP (FIG. 9(a)) on time, and has a length of 12 OFDM symbols in case of the extended CP (FIG. 9(b)).

FIG. 9 illustrates a position on a resource block of a reference signal in a system that supports four transmitting antennas through a base station. In FIG. 9, resource elements (REs) expressed as '0', '1', '2' and '3' respectively represent positions of CRS for antenna port indexes 0, 1, 2 and 3. In the meantime, the resource element expressed as 'D' in FIG. 9 represents a position of a DRS defined.

Hereinafter, the CRS will be described in more detail.

The CRS is used to estimate a channel of a physical antenna port, is a reference signal that may commonly be received in all the user equipments located within a cell, and is distributed over a full band. The CRS may be used for acquisition of channel state information (CSI) and data demodulation.

The CRS is defined in various formats depending on antenna configuration of the transmitting side (base station). The 3GPP LTE (for example, release-8) system supports various antenna configurations, and a downlink signal transmitting side (base station) has three types of antenna configurations of single antenna, two transmitting antennas and four transmitting antennas. If the base station performs single antenna transmission, a reference signal for a single antenna port is arranged. If the base station performs two-antenna transmission, reference signals for two antenna ports are arranged in accordance with a time division multiplexing (TDM) and/or frequency division multiplexing (FDM) scheme. In other words, the reference signals for two antenna ports may be arranged in different time resources and/or different frequency resources, whereby the reference signals may be identified from each other. Also, if the base station performs four-antenna transmission, reference signals for four antenna ports are arranged in accordance with a TDM/FDM scheme. The channel information estimated by a downlink signal receiving side (user equipment) through the CRS may be used for demodulation of data transmitted in accordance with a transmission scheme such as single antenna transmission, transmit diversity, closed-loop spatial multiplexing, open-loop spatial multiplexing, and multi-user MIMO (MU-MIMO).

If a MIMO antenna function is used, a reference signal is transmitted to a position of a resource element (RE) designated by a reference signal pattern when the reference signal is transmitted from a random antenna port, and no signal is transmitted to a position of a resource element (RE) designated for another antenna port.

A mapping rule of CRS on a resource block depends on the following Equation 12.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad [\text{Equation 12}]$$

$$v_{shift} = N_{ID}^{cell} \bmod 6$$

In the Equation 12, k is a subcarrier index, l is a symbol index, and p is an antenna port index. $N_{symb}^{DL}$ is the number of OFDM symbols in one downlink slot, $N_{RB}^{DL}$ is the number of resource blocks allocated to the downlink, $n_s$ is a slot index, and $N_{ID}^{cell}$ means cell ID. mod means modulo operation. A position of the reference signal in the frequency domain depends on a value of $V_{shift}$. Since the value of $V_{shift}$ depends on cell ID, the position of the reference signal has different frequency shift values per cell.

In more detail, the position of the CRS on the frequency domain may be shifted to enhance channel estimation performance through the CRS. For example, if the reference signal is located per three subcarriers, a cell may be arranged on a subcarrier of 3 k, and the other cells may be arranged on a subcarrier of 3k+1. In view of one antenna port, the reference signal is arranged in the frequency domain at an interval of six (6) resource elements (REs) (i.e., interval of six subcarriers), and maintains an interval of three resource elements in the frequency domain with the RE where the reference signal for other antenna port is arranged.

Also, power boosting may be applied to the CRS. Power boosting means that the power is derived from another RE not the RE allocated for the reference signal, among resource elements (REs) of one OFDM symbol, so as to transmit the reference signal at the higher power.

The reference signals in the time domain are arranged at constant intervals starting from symbol index (l) 0 of each slot. The time interval is defined differently depending on the CP length. In case of the normal CP, the reference signals are located at symbol indexes 0 and 4 of the slot. In case of the extended CP, the reference signals are located at symbol indexes 0 and 3 of the slot. Only reference signals for maximum two antenna ports are defined for one OFDM symbol. Accordingly, the reference signals for antenna ports 0 and 1 are located at the symbol indexes 0 and 4 (symbol indexes 0 and 3 in case of extended CP) of the slot during transmission of four transmitting antennas, and the reference signals for the antenna ports 2 and 3 are located at the symbol index 1 of the slot. However, the frequency positions of the reference signals for the antenna ports 2 and 3 are switched to each other at the second slot.

In order to support spectral efficiency higher than that of the 3GPP LTE (for example, 3GPP LTE release-8) system of the related art, a system (for example, LTE-A system) having extended antenna configuration may be designed. For example, extended antenna configuration may be configuration of eight transmitting antennas. The system having extended antenna configuration needs to support user equipments operated by the existing antenna configuration, i.e., backward compatibility. Accordingly, it is required to support a reference signal pattern based on the exiting antenna configuration and design a new reference signal pattern for additional antenna configuration. In this case, if a CRS for a new antenna port is added to the system having the existing antenna configuration, reference signal overhead is rapidly increased, whereby a data transmission rate is reduced. Considering this, design of a new reference signal (CSI-RS) for measuring channel state information (CSI) for a new antenna port has been discussed.

Hereinafter, the DRS will be described in more detail.

The DRS (or user equipment-specific reference signal) is the reference signal used for data demodulation, and a precoding weight value used for a specific user equipment during multi-antenna transmission is applied to this reference signal, whereby the user equipment may estimate an equivalent channel that includes a transport channel and the precoding weight value transmitted from each transmitting antenna when the user equipment receives the reference signal.

The existing 3GPP LTE system (for example, release-8) supports transmission of maximum four transmitting antennas, and a DRS for rank 1 beamforming is defined in this existing 3GPP LTE system. The DRS for rank 1 beamforming may be referred to as a reference signal for antenna port index 5. A mapping rule of the DRS on the resource block depends on the following Equations 13 and 14. The Equation 13 is for the normal CP, and the Equation 14 is for the extended CP.

[Equation 13]
$$k = (k') \bmod N_{sc}^{RB} + N_{sc}^{RB} \cdot n_{PRB}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

[Equation 14]
$$k = (k') \bmod N_{sc}^{RB} + N_{sc}^{RB} \cdot n_{PRB}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In the Equations 13 and 14, k is a subcarrier index, l is a symbol index, and p is an antenna port index. $N_{SC}^{RB}$ represents the size of the resource block in the frequency domain, and is expressed by the number of subcarriers. $n_{PRB}$ represents a physical PDSCH resource block number. $N_{RB}^{PDSCH}$ represents a bandwidth of the resource block of corresponding PDSCH transmission. $n_s$ is a slot index, and $N_{ID}^{cell}$ means cell ID. Also, mod means modulo operation. A position of the reference signal in the frequency domain depends on a value of $V_{shift}$. Since the value of $V_{shift}$ depends on cell ID, the position of the reference signal has different frequency shift values per cell.

In the meantime, the LTE-A system which is an evolved version of the LTE system may support maximum eight transmitting antennas for downlink transmission. Accordingly, reference signals for maximum eight transmitting antennas should also be supported. In the LTE system, since downlink reference signals are defined for maximum four antenna ports, if the base station includes minimum four downlink transmitting antennas to maximum eight downlink transmitting antennas in the LTE-A system, reference signals for these antenna ports should be defined additionally. The reference signals for maximum eight transmitting antenna ports should be considered for two types of reference signals, i.e., reference signal for channel measurement and reference signal for data demodulation.

One of important considerations in designing the LTE-A system is backward compatibility. Backward compatibility means that the LTE user equipment of the related art should be operated normally even in the LTE-A system without any problem. In view of reference signal transmission, if reference signals for maximum eight transmitting antenna ports should be defined additionally in the time-frequency domain to which CRS defined in the LTE standard is transmitted to a full band every subframe, RS overhead becomes too great. Accordingly, it should be considered that RS overhead is reduced in newly designing RS for maximum eight antenna ports.

The reference signal newly introduced in the LTE-A system may be divided into two types. One of the reference signals is a demodulation-reference signal (DM-RS) for demodulation of data transmitted through maximum eight transmitting antennas. If data are transmitted on a downlink subframe, a dedicated DM RS is transmitted to a user equipment scheduled for data transmission. DM RS dedicated for a specific user equipment may be designed to be transmitted only in a resource region where the corresponding user equipment is scheduled, that is, a time-frequency domain to which data of the corresponding user equipment are transmitted. The other one of the reference signals is a channel state information-reference signal (CSI-RS) which is for channel measurement for selection of transmission rank, modulation and coding scheme (MCS) and precoding matrix index (PMI).

The CSI-RS for channel measurement is designed for channel measurement mainly unlike the existing CRS used for channel measurement, handover measurement, and data demodulation. The CSI-RS may also be used for handover measurement. Since the CSI-RS is transmitted only to obtain channel state information, it may not be transmitted per subframe unlike the CRS of the existing LTE system. Accordingly, in order to reduce overhead of the CSI-RS, the CSI-RS may be designed to be intermittently (for example, periodically) be transmitted on the time axis.

Figure 10:
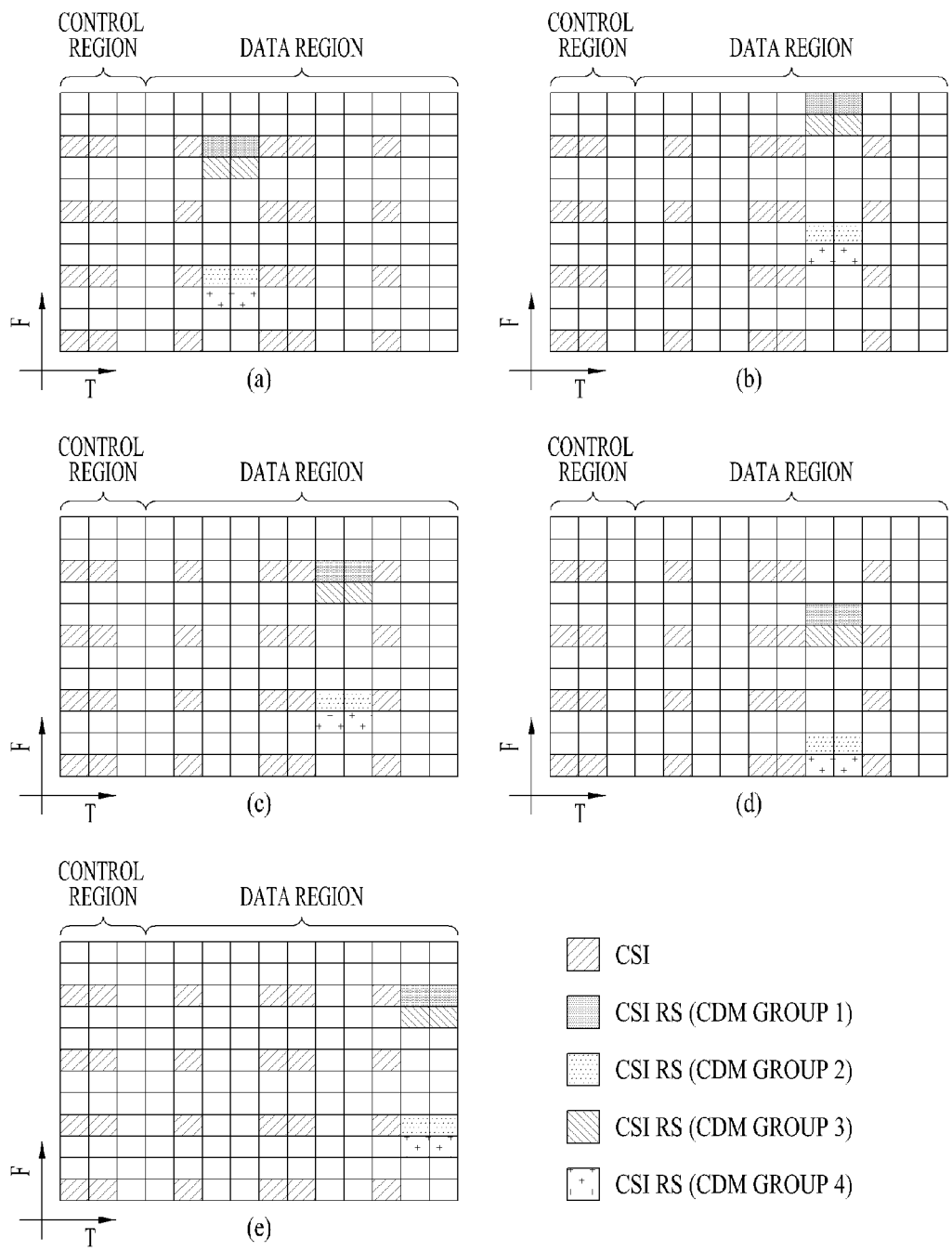
FIG. 10 is a diagram illustrating examples of CSI-RS pattern defined in an LTE-A system.

FIG. 10 is a diagram illustrating examples of CSI-RS pattern defined in the LTE-A system. FIG. 10 illustrates a position of a resource element where CSI-RSs are transmitted on one resource block (in case of normal CP, 14 OFDM symbols on the time×12 subcarriers on the time) to which downlink data are transmitted. One of CSI-RS patterns in FIG. 10(*a*) to FIG. 10(*e*) may be used for a random downlink subframe. The CSI-RS may be transmitted for eight antenna ports (antenna port indexes 15, 16, 17, 18, 19, 20, 21 and 22) defined additionally in the LTE-A system. The CSI-RSs for different antenna ports may be identified from one another in such a manner that they are located on different frequency resources (subcarriers) and/or different time resources (OFDM symbols) (that is, the CSI-RSs may be multiplexed in accordance with FDM and/or TDM mode). Also, the CSI-RSs for different antenna ports located on the same time-frequency resource may be identified from one another by orthogonal codes (that is, the CSI-RSs may be multiplexed in accordance with CDM mode). In the example of FIG. 10(*a*), the CSI-RSs for the antenna ports 15 and 16 may be located on the resource elements (REs) of CSI-RS CDM group 1, and may be multiplexed by orthogonal codes. In the example of FIG. 10(*a*), the CSI-RSs for the antenna ports 17 and 18 may be located on the resource elements (REs) of CSI-RS CDM group 2, and may be multiplexed by orthogonal codes. In the example of FIG. 10(*a*), the CSI-RSs for the antenna ports 19 and 20 may be located on the resource elements (REs) of CSI-RS CDM group 3, and may be multiplexed by orthogonal codes. In the example of FIG. 10(*a*), the CSI-RSs for the antenna ports 21 and 22 may be located on the resource elements (REs) of CSI-RS CDM group 4, and may be multiplexed by orthogonal codes. The same principle described based on FIG. 10(*a*) may be applied to FIG. 10(*b*) to FIG. 10(*e*).

The RS patterns of FIGS. 9 and 10 are only exemplary, and various embodiments of the present invention are not limited to a specific RS pattern. In other words, various embodiments of the present invention may equally be applied to even a case where RS pattern different from those of FIGS. 9 and 10 is defined and used.

Feedback of Channel State Information (CSI)

In order to perform the MIMO scheme normally, a receiving side may feed a rank indicator (RI), a precoding matrix index (PMI) and a channel quality indicator (CQI) back to a transmitting side. These RI, PMI and CQI may be referred to as channel state information (CSI).

The RI is information on a channel rank. The rank of the channel means a maximum number of layers that may transmit different kinds of information. The RI is determined from the number of allocated transmission layers, and may be acquired from related downlink control information (DCI).

The PMI is information on a precoding matrix used for transmission from the transmitting side. Precoding means mapping of a transmission layer into a transmitting antenna. A layer-to-antenna mapping relation may be determined by a precoding matrix. In order to reduce feedback overhead of precoding information, the transmitting side and the receiving side previously share a codebook, which includes several precoding matrixes, and a scheme for feeding back only index indicating a specific precoding matrix from the corresponding codebook may be used.

The CQI is information indicating channel quality. The CQI may be expressed by previously determined MCS combination. In other words, the CQI index, which is fed back, represents a corresponding modulation scheme and code rate.

A detailed method for enabling a user equipment to feed CSI back through an uplink control channel will be referred to as CSI configuration information. For example, the CSI configuration information may include the time when CSI is fed back, a period, offset, order and channel for CSI feedback.

Figure 11:
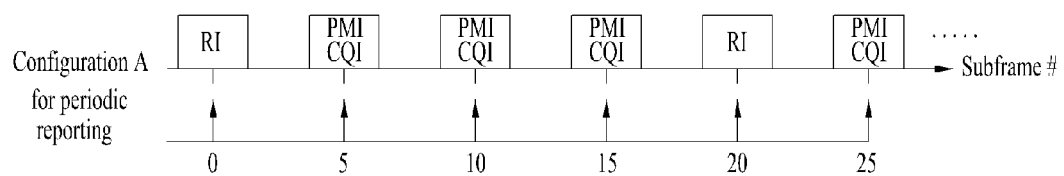
FIG. 11 is a diagram illustrating an example of CSI feedback in a non-CoMP system.

FIG. 11 is a diagram illustrating an example of CSI feedback in a non-CoMP system. In more detail, FIG. 11 illustrates an example of enabling a user equipment to feed CSI back by using a container of a PUCCH format 2 at a period of 5 ms. Also, according to CSI configuration information of FIG. 11, CSI feedback is performed in such a manner that RI is transmitted to the first container and PMI and CQI are respectively transmitted to second to fourth containers.

In the meantime, new CSI may be used for a system (for example, LTE-A system) that supports extended antenna configuration. For example, precoding information fed back from the receiving side may be indicated by combination of two PMIs. One (first PMI) of the two PMIs may be referred to as W1 (or second type PMI). The other one (second PMI) of the two PMIs may be referred to as W2 (or first type PMI). Final PMI may be determined by combination (or function) of W1 and W2. For example, if the final PMI is W, W=W1*W2 or W=W2*W1 may be defined.

Also, RI and W1 reflect average properties on a frequency or time domain of a channel. In other words, RI and W1 may reflect channel properties of wideband in the frequency domain and channel properties of long term in the time domain. In order to briefly express the properties of RI and W1, RI and W1 will be referred to as CSI of long term-wideband properties in this specification. In other words, the term CSI of long term-wideband properties in this specification means CSI that reflects properties of long term channel on the time domain, CSI that reflects properties of wideband channel on the frequency domain, or CSI that simultaneously reflects properties of long term on the time domain and properties of wideband channel on the frequency domain.

Also, W2 and CQI are determined on the basis of RI and W1, and reflect channel properties relatively more instantaneous than those of RI and W1. In other words, W2 and CQI may reflect channel properties of subband in the frequency domain, and may reflect channel properties of short term in the time domain. In order to briefly express the properties of W2 and CQI, W2 and CQI will be referred to as CSI of short term-subband properties in this specification. In other words, the term CSI of short term-subband properties in this specification means CSI that reflects properties of short term channel on the time domain, CSI that reflects properties of subband channel on the frequency domain, or CSI that reflects properties of short term on the time domain and properties of subband channel on the frequency domain.

As described above, in the LTE-A system, CSI may include RI, W1, W2 and CQI. Accordingly, it is required that a new method for transmitting and receiving feedback information should be defined. In this respect, detailed embodiments of the present invention will be described later.

CSI Feedback in CoMP System

In the CoMP system, the user equipment may receive a downlink channel from multiple cells, and may feed CSI on the downlink channel from each cell back. Hereinafter, the cell which joins in or may join in CoMP operation will be referred to as a CoMP cell. Also, the user equipment that performs or may perform transmission and reception based on the CoMP operation will be referred to as a CoMP user equipment. In the following examples, for convenience of description, it is assumed that the number of cells joining in the CoMP operation is 2. However, the scope of the present invention is not limited to the following examples, and the principle of the present invention may equally be applied to even a case where three or more CoMP cells exist.

Figure 12:
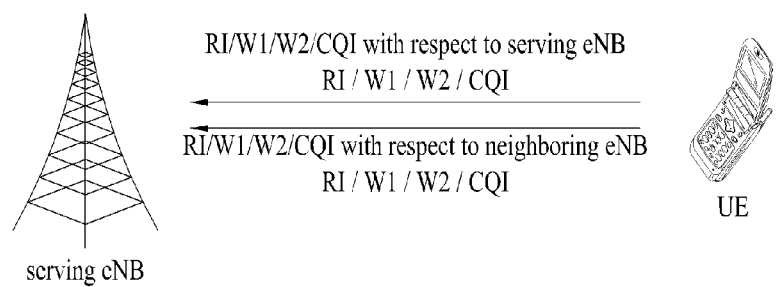
FIG. 12 is a diagram illustrating an example of CSI feedback in a CoMP system.

FIG. 12 is a diagram illustrating an example of CSI feedback in a CoMP system. The user equipment may transmit CSI on a neighboring cell (or neighboring eNB) which joins in CoMP operation, in the same manner as CSI transmission scheme of the serving cell in feeding CSI on each CoMP cell back. For example, supposing that one neighboring cell joins in the CoMP operation, the CoMP user equipment may calculate CSI of the same format for the serving cell and the neighboring cell and feed the calculated CSI back. If a radio channel exists between the CoMP user equipment and the neighboring cell, the CoMP user equipment may directly feed CSI on the neighboring cell back to the corresponding neighboring cell. Alternatively, as shown in FIG. 12, the user equipment served by the serving cell may feed CSI (RI, W1, W2 and CQI) on the neighboring cell back to the serving cell. In this case, the CSI fed back from the user equipment through a backhaul link may be shared between the cells.

At this time, in the CoMP system, as the user equipment feeds CSI on the neighboring cell as well as CSI on the serving cell back, payload is increased, whereby it is difficult for the CSI feedback method of the non-CoMP system according to the CSI configuration information of FIG. 11 to be used in the CoMP system.

CSI Configuration Information in CoMP System

Hereinafter, CSI configuration information for effectively feeding CSI, of which payload is increased in the CoMP system, back will be described.

Figure 13:
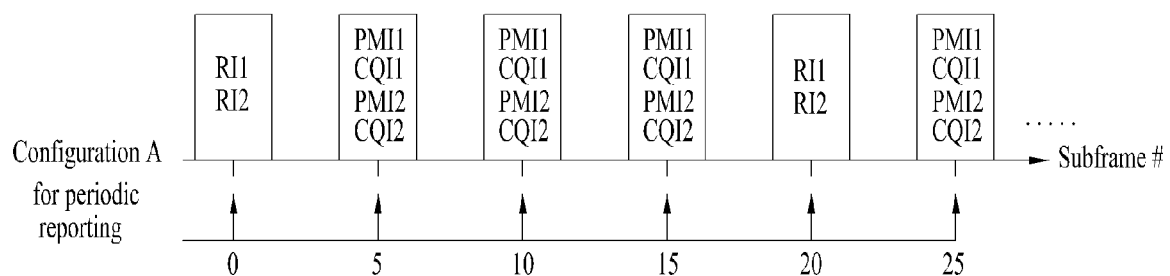
FIG. 13 is a diagram illustrating an example of CSI feedback that increases payload size of a container.

First of all, the user equipment may feed CSI back by increasing payload size of a container to which CSI is transmitted. FIG. 13 is a diagram illustrating an example of CSI feedback that increases payload size of a container. Referring to FIG. 13, the user equipment may transmit CSI on the serving cell and CSI on the neighboring cell together in accordance with the CSI configuration information for increasing the payload size of the container. For example, the user equipment may feed CSI back by using a container of a PUCCH format 3, which has a payload size greater than that of a container of a PUCCH format 2 used in the non-CoMP system. Also, in FIG. 13 illustrates an example of CSI feedback in the order of RIs RI1 and RI2 of the serving cell and the neighboring cell transmitted to the first container and PMI and CQI (PMI1, CQI1, PMI2 and CQI2) of the serving cell and the neighboring cell transmitted to the second to fourth containers.

Figure 14:
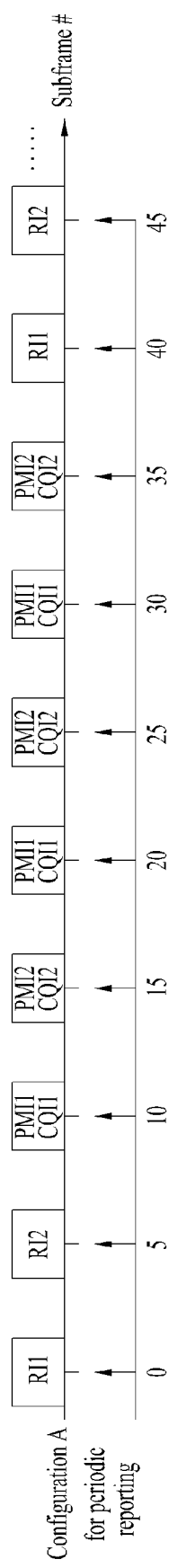
FIG. 14 is a diagram illustrating an example of CSI feedback that alternately transmits CSI of a serving cell and CSI of a neighboring cell.

Next, the user equipment may use CSI configuration information for separately transmitting CSI of the serving cell and CSI of the neighboring cell. FIG. 14 is a diagram illustrating an example of CSI feedback that alternately transmits CSI of a serving cell and CSI of a neighboring cell. Referring to FIG. 14, the user equipment may transmit CSI (RI1, PMI1, and CQI1) on the serving cell to the odd numbered container, and may transmit CSI (RI2, PMI2, and CQI2) on the neighboring cell to the even numbered container. Although FIG. 14 illustrates an example of CSI configuration information for alternately transmitting CSI of the serving cell and CSI of the neighboring cell at the same period, the period and order of transmission of the CSI of the serving cell and the CSI of the neighboring cell may be varied without limitation to the example of FIG. 14.

Next, the user equipment may feed the CSI of the serving cell and the CSI of the neighboring cell back in accordance with CSI configuration information transmitted for continuous subframes. According to the CSI configuration information of FIG. 14, the base station delays scheduling until every CSI required for CoMP is received. For example, although the base station receives CSI on the serving cell for a subframe 10 of FIG. 14, the base station should wait to perform CoMP operation until a subframe 15 for which the CSI on the neighboring cell is received. In this case, a channel state of the serving cell is varied for the delayed time, whereby CoMP throughput maybe deteriorated. Also, although the base station may use the CSI on the neighboring cell instead of waiting to receive the CSI on the neighboring cell, the base station uses CSI for the delayed time, whereby CoMP throughput may be deteriorated. Accordingly, the user equipment may transmit the CSI of the serving cell and the CSI of the neighboring cell for continuous subframes, whereby the above problem may be solved.

Figure 15:
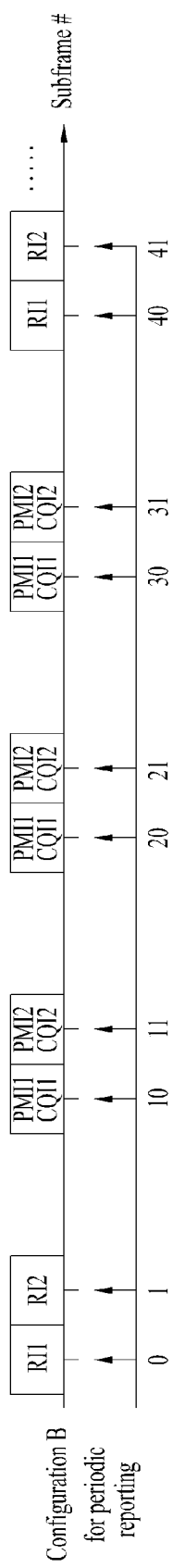
FIG. 15 is a diagram illustrating an example of CSI feedback that transmits CSI of a serving cell and CSI of a neighboring cell for continuous subframes.

First of all, the user equipment may feed the CSI back by using the continuous subframes in accordance with one CSI configuration information on the serving cell and the neighboring cell. Alternatively, the user equipment may feed the CSI back for the continuous subframes by respectively using CSI configuration information on the serving cell and CSI configuration information on the neighboring cell and equally setting periods of these two kinds of CSI configuration information and dependently setting offset difference of these two kins of CSI configuration to become 1. FIG. 15 is a diagram illustrating an example of CSI feedback that transmits CSI of a serving cell and CSI of a neighboring cell for continuous subframes. Referring to FIG. 15, the user equipment transmits the CSI on the serving cell and the CSI on the neighboring cell for continuous subframes 0, 1, 10 and 11. Also, although FIG. 15 illustrates that the user equipment first transmits the CSI on the serving cell, the transmission order of the CSI on the serving cell and the CSI on the neighboring cell may be changed. If the transmission order of the CSI on the serving cell and the CSI on the neighboring cell is fixed, the CSI, which is first transmitted, is delayed for one subframe, whereby the user equipment may distribute time delay into several cells by changing the order.

In the meantime, when the CSI on the serving cell and the CSI on the neighboring cell are transmitted through one control channel, the base station should identify a cell to which the transmitted CSI belongs. For example, a feedback period and order of the CSI on the serving cell and the CSI on the neighboring cell may be determined by the base station and then may be transmitted from the base station to the user equipment, or vice versa. If the user equipment determines the feedback period and order and notifies the base station of the determined feedback period and order, since the user equipment may not transmit the CSI on some cell, the user equipment needs to notify the base station of the cell to which the transmitted CSI belongs. In this way, if the user equipment transmits CSI cell information and the feedback period and order together with the CSI whenever the user equipment transmits the CSI, overload may occur.

Figure 16:
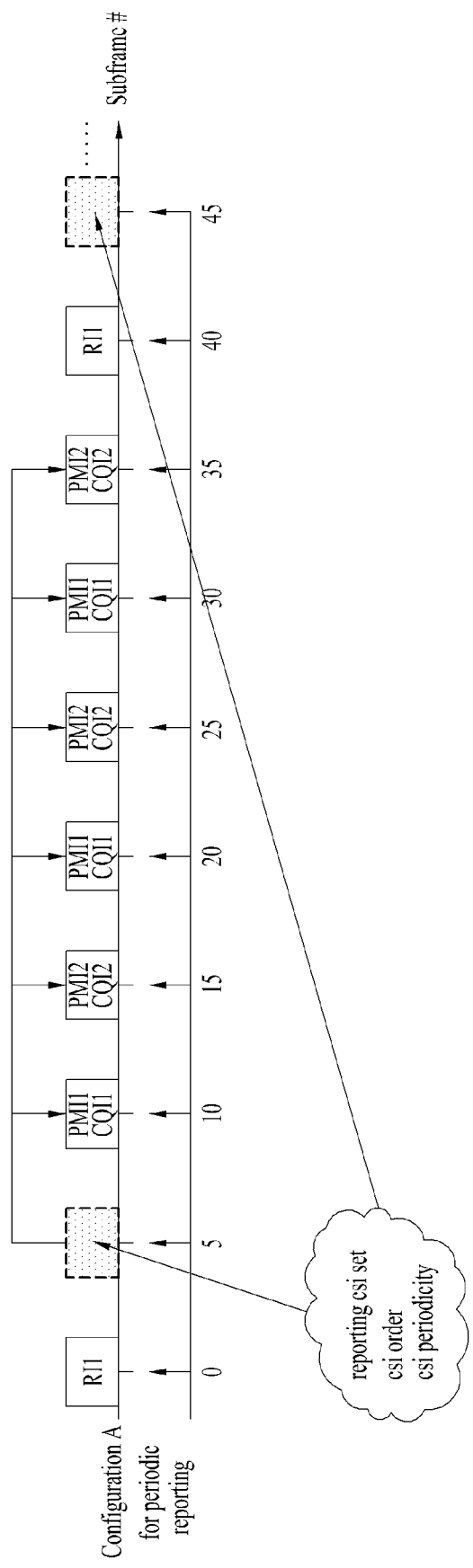
FIG. 16 is a diagram illustrating an example of CSI feedback that transmits CSI configuration information.

In order to reduce overload, the user equipment may transmit new feedback configuration information to the base station. For example, the new feedback configuration information may include CSI cell set (reporting CSI set), feedback order of each cell (CSI order), and feedback period (CSI periodicity). FIG. 16 is a diagram illustrating an example of CSI feedback that transmits CSI configuration information. Referring to FIG. 16, the user equipment may transmit information based on feedback configuration information having cell set information (CSI1 and CSI2), feedback period (CSI1=10 ms and CSI2=10 ms) and feedback order (CSI1 and CSI2) for a subframe 5 and then transmit the information at a period of 40 subframes. At this time, if transmission of RI for the serving cell is omitted as shown in FIG. 16, the information based on the feedback configuration information may be transmitted at the time when transmission of RI is omitted. This will be described later in more detail with reference to FIG. 20.

Figure 17:
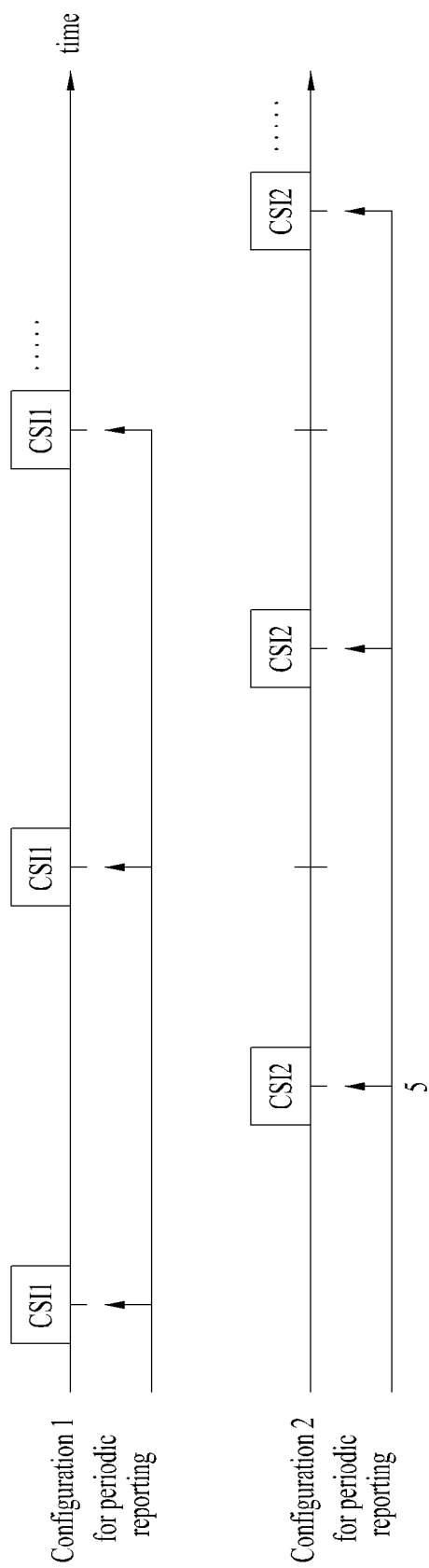
FIG. 17 is a diagram illustrating an example of transmitting CSI of a serving cell and CSI of a neighboring cell as their respective CSI configuration information.

Unlike the CSI configuration information described with reference to FIG. 14 and FIG. 15, the CSI on the serving cell and the CSI on the neighboring cell may be transmitted as their respective CSI configuration information differently from each other. FIG. 17 is a diagram illustrating an example of transmitting CSI of a serving cell and CSI of a neighboring cell as their respective CSI configuration information. At this time, the first CSI configuration information and the second CSI configuration information may share some configuration. In other words, a parameter of some or all of configuration information that reports the CSI on the neighboring cell may be set as the same value as that of a parameter corresponding to configuration information that reports the CSI on the serving cell. For example, the first CSI configuration information and the second CSI configuration information may be set to have the same value as each other for at least one of feedback period, offset, PUCCH resource, K, H' and feedback mode. K is set to determine a cycle of a band part if the feedback mode is a sub band mode. H' is set to determine a period for transmitting short term/sub band PMI if a precoding type indicator (PTI) is set to 0. The feedback mode is set to select one of a periodic or non-periodic feedback mode, a frequency selective or non-selective feedback mode, and a feedback mode based on PUCCH or PUCCH. The base station may transmit CQI report configuration information element, which includes configurations for determining the CSI configuration information, to the user equipment through RRC signaling. At this time, if the second CSI configuration information does not share some parameter with the first CSI configuration information, the base station may transmit the parameter which is not shared between the first CSI configuration information and the second CSI configuration to the user equipment through a new field. In other words, the base station may omit transmission for the shared parameter. For example, as shown in FIG. 17, if only offset is different between the first CSI configuration information and the second CSI configuration information, the base station may transmit only offset of the second CSI configuration information through a new field of the CQI report configuration information element and allow the other of the second CSI configuration information to share configuration of the first CSI configuration information.

Method for Reducing Feedback Overhead of CoMP System

If the same CSI for each CoMP cell is fed back, CSI feedback overhead is increased in accordance with the number of CoMP cells. In this case, overhead of resources, which may be used, by the user equipment, for transmission to the base station, for a control signal is increased, whereby resources that may be used for data transmission are reduced. Hereinafter, a method for efficiently transmitting CSI to reduce feedback overhead while achieving sufficient CSI exactness will be described in detail.

As described above, if the CSI is fed back for each CoMP cell in the same manner, CSI feedback overhead is increased in accordance with the number of CoMP cells. In this case, overhead of resources, which may be used, by the user equipment, for transmission to the base station, for a control signal is increased, whereby resources that may be used for data transmission are reduced. Hereinafter, a method for efficiently transmitting CSI to reduce feedback overhead while achieving sufficient CSI exactness will be described in detail.

Figure 18:
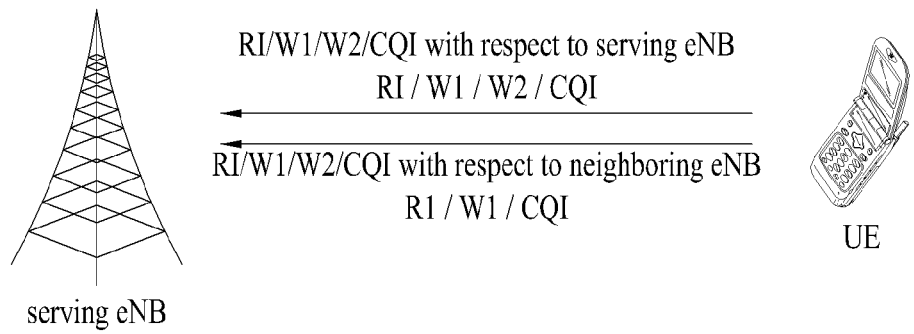
FIG. 18 is a diagram illustrating another example of CSI feedback in a CoMP system.

FIG. 18 is a diagram illustrating another example of CSI feedback in a CoMP system. In feeding CSI for each CoMP cell back, the user equipment may feed RI, W1, W2 and CQI back to the serving cell and feed RI, W1 and CQI except for W2 back to the neighboring cell. In this case, since PMI for the neighboring cell is configured by W1 only without W2, a quantization error is greater than that of PMI based on both W1 and W2, whereas feedback overhead may be reduced as much as absence of W2. CSI feedback for the neighboring cell is used to determine whether the corresponding neighboring cell will join in CoMP operation, and is also used to determine what CoMP scheme will be used to operate the corresponding neighboring cell. In other words, since the CSI on the neighboring cell is fed back, it may be determined that the corresponding neighboring cell does not join in the CoMP operation. Accordingly, it may be more preferable that feedback overhead is reduced even there is loss in exactness, than that exact CSI is provided by taking high feedback overhead for the neighboring cell.

As described above, more exact channel information may be fed back to the serving cell, whereby MU-MIMO gain may be obtained sufficiently. In other words, in order to perform MU-MIMO, it is required to feed channel states of a plurality of user equipments more exactly. If more exact PMI is fed back, MU-MIMO operation of excellent throughput may be operated. Also, even though average information of a channel having low exactness is fed back to the neighboring cell that joins in cooperation, the neighboring cell may sufficiently join in cooperative beamforming or joint transmission.

At this time, CQI of the neighboring cell may correspond to CSI of long term-wideband attribute calculated using RI and W1. In other words, it may be regarded that W2 of short term-subband attribute is not transmitted to the neighboring cell and the other RI, W1 and CQI correspond to CSI of long term-wideband attribute. If the CSI on the neighboring cell corresponds to the CSI of the long term-wideband attribute, a feedback period is increased (that is, feedback is performed less frequently), and channel information on a wider frequency band is fed back. As a result, it is advantageous in that CSI feedback overhead per unit radio resource is reduced.

If a radio channel exists between the CoMP user equipment and the neighboring cell, the CoMP user equipment may feed the CSI on the neighboring cell back to the corresponding neighboring cell. Alternatively, as shown in FIG. 18, the user equipment served by the serving cell may feed the CSI (RI, W1 and CQI) on the neighboring cell back to the neighboring cell. In this case, the CSI fed back from the user equipment through a backhaul link may be shared between the cells.

Figure 19:
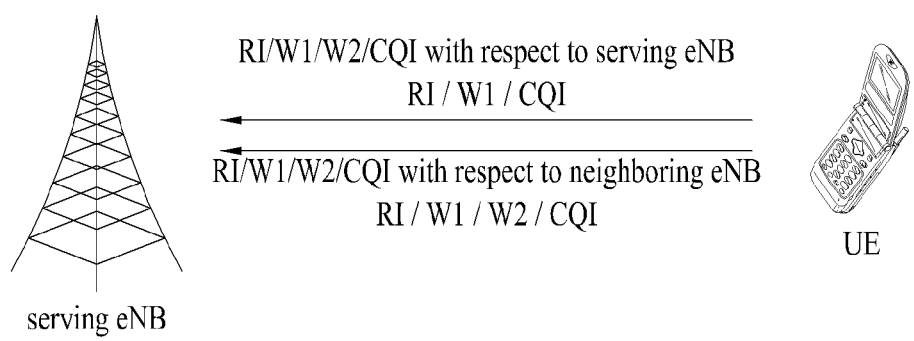
FIG. 19 is a diagram illustrating other example of CSI feedback in a CoMP system.

FIG. 19 is a diagram illustrating other example of CSI feedback in a CoMP system. In feeding CSI for each CoMP cell back, the user equipment may feed RI, W1, and CQI except for W2 back to the serving cell and feed RI, W1, W2 and CQI back to the neighboring cell. In other words, unlike the example of FIG. 18, feedback of W2 to the serving cell is omitted.

In this case, MU-MIMO gain performed by the serving cell may be lowered as much as reduced exactness of PMI for the serving cell. However, even PMI having low exactness may be sufficient to allow the serving cell to perform SU-MIMO for the corresponding user equipment. Also, sufficient gain may be obtained to perform CoMP operation with the neighboring cell. Accordingly, the serving cell may serve the user equipment in accordance with the SU-MIMO scheme, and the neighboring cell may be operated in accordance with coordinated beamforming. At this time, the neighboring cell may reduce interference on the serving cell more effectively by using PMI (that is, W1 and W2 for neighboring cell) of high exactness fed back from the corresponding user equipment.

If a radio channel exists between the CoMP user equipment and the neighboring cell, the CoMP user equipment may feed the CSI on the neighboring cell back to the corresponding neighboring cell. Alternatively, as shown in FIG. 19, the user equipment served by the serving cell may feed the CSI (RI, W1, W2 and CQI) on the neighboring cell back to the serving cell. In this case, the CSI fed back from the user equipment through a backhaul link may be shared between the cells.

Hereinafter, a method for additionally reducing feedback overhead will be described. The method for additionally reducing feedback overhead may be applied to various embodiments suggested in the present invention.

First of all, the user equipment may additionally reduce feedback overhead by restricting RI for the neighboring cell, which is fed back from the user equipment.

As one example, RI of the neighboring cell may be fixed to 1. In other words, the CoMP user equipment may calculate and report the CSI on the neighboring cell by always fixing a rank value to 1, and may calculate and report PMI and CQI on the assumption that rank is 1. In this case, PMI on the neighboring cell, which is reported by the CoMP user equipment, becomes one column vector, which represents a direction of the strongest channel interference from the neighboring cell. Accordingly, the neighboring cell joining in cooperation may reduce interference by performing beamforming in the other direction except for a beam direction that gives the strongest interference to the serving cell. Alternatively, if the neighboring cell performs the CoMP operation in accordance with joint transmission, the neighboring cell may perform beamforming in a channel direction that gives the strongest interference thereto.

As another example, RI of the neighboring cell may be fixed equally to RI of the serving cell. For example, if RI value reported by the CoMP user equipment as the CSI on the serving cell is 'r', RI reported by the corresponding user equipment as the CSI on the neighboring cell is also fixed to 'r', and PMI and CQI may be calculated and reported on the assumption that rank is 'r'. In this case, PMI on the neighboring cell, which is reported by the CoMP user equipment, includes 'r' number of column vectors. At this time, each column vector constituting PMI on the neighboring cell may represent a direction of an interference channel, which causes the strongest interference from the neighboring cell, or represent a direction of an interference channel, which causes the weakest interference.

If 'r' number of column vectors constituting PMI on the neighboring cell represent a direction of an interference channel, which causes the strongest interference, the CoMP operation of the neighboring cell may be performed as follows. For example, if the neighboring cell performs the CoMP operation in accordance with the coordinated beamforming scheme, the neighboring cell may reduce interference by performing beamforming in the other direction except for the direction of 'r' number of channels, which cause the strongest interference. Alternatively, if the neighboring cell performs the CoMP operation in accordance with the joint transmission scheme, the neighboring cell may perform beamforming in the direction of 'r' number of channels, which cause the strongest interference.

On the other hand, if 'r' number of column vectors constituting PMI on the neighboring cell represent a direction of an interference channel, which causes the weakest interference, the CoMP operation of the neighboring cell may be performed as follows. For example, if the neighboring cell performs the CoMP operation in accordance with the coordinated beamforming scheme, the neighboring cell may reduce interference by performing beamforming in the direction of 'r' number of channels, which cause the weakest interference. Alternatively, if the neighboring cell performs the CoMP operation in accordance with the joint transmission scheme, the neighboring cell may perform beamforming in the other direction except for the direction of 'r' number of channels, which cause the weakest interference.

Additional CSI in CoMP system

Figure 20:
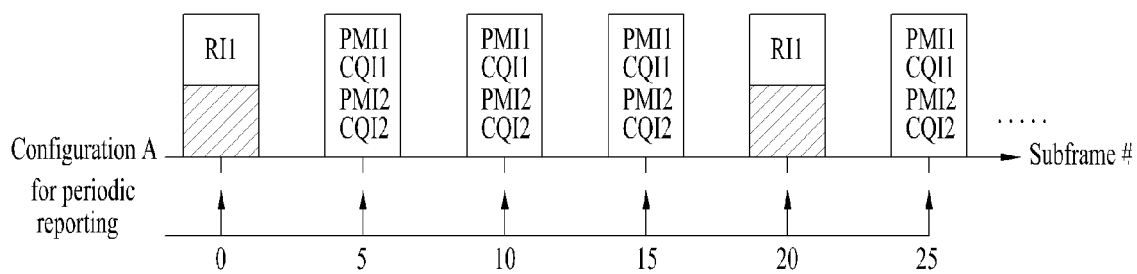
FIG. 20 is a diagram illustrating a restricted example of RI in an example of CSI feedback of FIG. 13.
Figure 21:
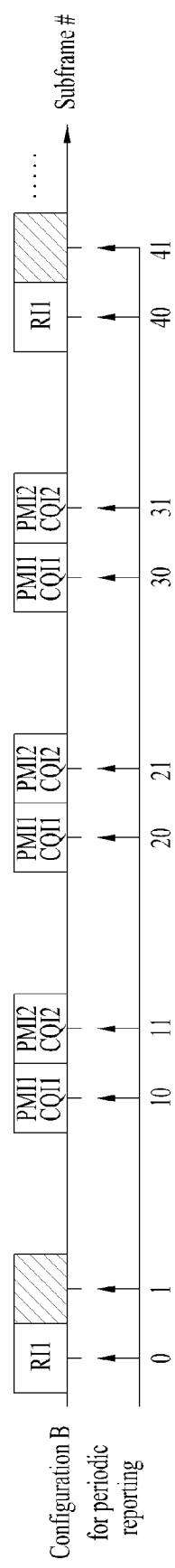
FIG. 21 is a diagram illustrating a restricted example of RI in an example of CSI feedback of FIG. 15.

If the method for reducing feedback overhead of the CoMP system is used, the amount of the CSI transmitted from the user equipment may be reduced, whereby resources may be saved. The user equipment may improve CoMP throughput by transmitting additional CSI for the CoMP operation using the saved resources. For example, when RI of the neighboring cell is fixed to 1 or is determined equally to RI of the serving cell, the user equipment may transmit additional CSI instead of transmitting RI of the neighboring cell. FIG. 20 is a diagram illustrating a restricted example of RI in an example of CSI feedback of FIG. 13, and FIG. 21 is a diagram illustrating a restricted example of RI in an example of CSI feedback of FIG. 15. In FIGS. 20 and 21, slashed areas represent resources where additional CSI instead of RI of the neighboring cell may be transmitted.

Hereinafter, additional CSI transmitted instead of reduced CSI in the CoMP system will be described in detail.

First of all, when a coherent joint transmission scheme of the aforementioned CoMP scheme is used, additional CSI may be phase compensated information representing phase difference between the signal received by the user equipment from the serving cell and the signal received by the user equipment from the neighboring cell. In case of the joint transmission scheme, the respective base stations transmit same data to the user equipment at the same time. At this time, in order to improve gain of CoMP, the base station should compensate phase difference between the signals and transmit the compensated result. In the CoMP system, the user equipment may improve CoMP throughput by transmitting phase compensated information by using the saved resources.

Next, additional CSI may be aggregated CSI. Aggregated CSI is CSI on a channel when the joint transmission scheme is used, and is generated on the basis of aggregation of the signals simultaneously transmitted from the plurality of base stations. Generally, if the user equipment feeds the CSI on the serving cell and the CSI on the neighboring cell back, the base station determines whether to apply the joint transmission scheme on the basis of the received plurality of CSI, and generates aggregated CSI on the basis of the plurality of CSI if the joint transmission scheme is applied. According to the present invention, if the joint transmission scheme is applied, the user equipment may provide the aggregated CSI to the base station as additional CSI.

Next, additional CSI may be CoMP transmission point set information. The CoMP transmission point set information is the information representing a point (base station) to which PMI or CQI transmitted together with the CoMP transmission point set information belongs. For example, the user equipment may measure channel states of three base stations and select two base stations having excellent channel state as the transmission point set. At this time, the user equipment may feed PMI or CQI for the selected two base stations back to the base station, and may represent information on the corresponding base station as the CoMP transmission point set information.

Next, additional CSI may be long term channel information that may be used for data transmission and scheduling of the base station. For example, the user equipment may transmit long term covariance matrix information indicating a vector direction of high channel received strength to the base station, whereby the base station may transmit data efficiently.

Next, additional CSI may be a channel quality indicator (CQI) for rank 1 of the neighboring cell. If rank is 2 or more, since multiple layers are mapped into one CQI, the base station may have difficulty in determining a proper MCS level by compensating CQI. If the user equipment transmits CQI for rank 1 of the neighboring cell as additional CSI, the base station may determine a proper MCS level relatively effectively by using the CQI for rank 1.

Next, additional CSI may include information on PMI aggregation scheme of each base station for the joint transmission scheme. When the joint transmission scheme is used, the user equipment determines a precoding matrix, which may properly be used by each base station, by specifying CIS-RS from each base station. At this time, the user equipment may define and use the correlation between the column vectors and the precoding matrix of each base station. For example, the user equipment may report what column vector of a precoding matrix is connected with a column vector of another precoding matrix by using additional feedback bit (additional CSI) in reporting the precoding matrix of each base station. For another example, if rank values of the respective base stations are different from each other, additional feedback bit (additional CSI) indicating how the precoding matrix of the base station having the smaller rank value is connected with the precoding matrix of the base station having the greater rank value may be used. The PMI aggregation scheme according to the present invention is not limited to the above example, and additional CSI may include information on various PMI aggregation schemes.

Next, additional CSI may be muting point information for enabling the user equipment to designate one of a plurality of CoMP base stations, which does not join in CoMP cooperation. For example, when the third one of the CoMP base stations does not join in CoMP cooperation, the user equipment may transmit additional CSI using the third base station as a muting point if CoMP throughput is improved.

In the meantime, if additional CSI is not transmitted from the CoMP system, the method for CSI feedback may be improved for efficient CSI feedback.

Figure 22:
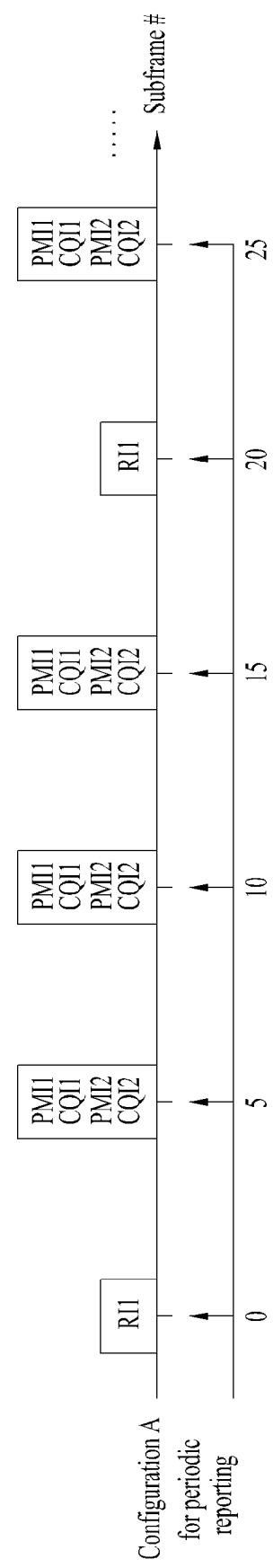
FIG. 22 is a diagram illustrating an example of CSI feedback when additional. CSI is not transmitted in a CoMP system.

FIG. 22 is a diagram illustrating an example of CSI feedback when additional CSI is not transmitted in a CoMP system. Referring to FIG. 22, CSI may be fed back using several container types within one CSI configuration information. For example, RI of the serving cell may be transmitted using the container of the PUCCH format 2 having a size of the related art for the subframes 0 and 20, and the other containers of the PUCCH format 3 of which payload size is increased may be used for CSI feedback.

Figure 23:
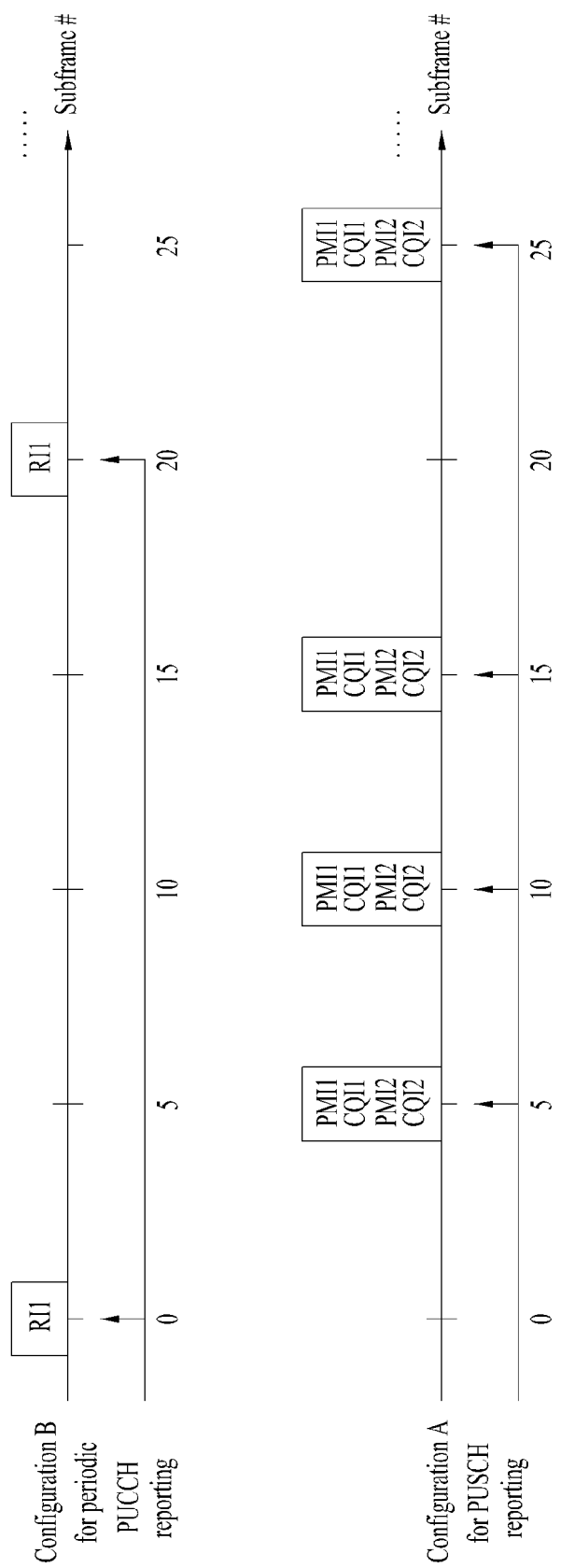
FIG. 23 is a diagram illustrating another example of CSI feedback when additional CSI is not transmitted in a CoMP system.

FIG. 23 is a diagram illustrating another example of CSI feedback when additional CSI is not transmitted in a CoMP system. Referring to FIG. 23, RI1 of the serving cell may use CSI configuration information of the related art, which is transmitted using PUCCH, and the other CSI may be fed back using CSI configuration information based on PUSCH.

Figure 24:
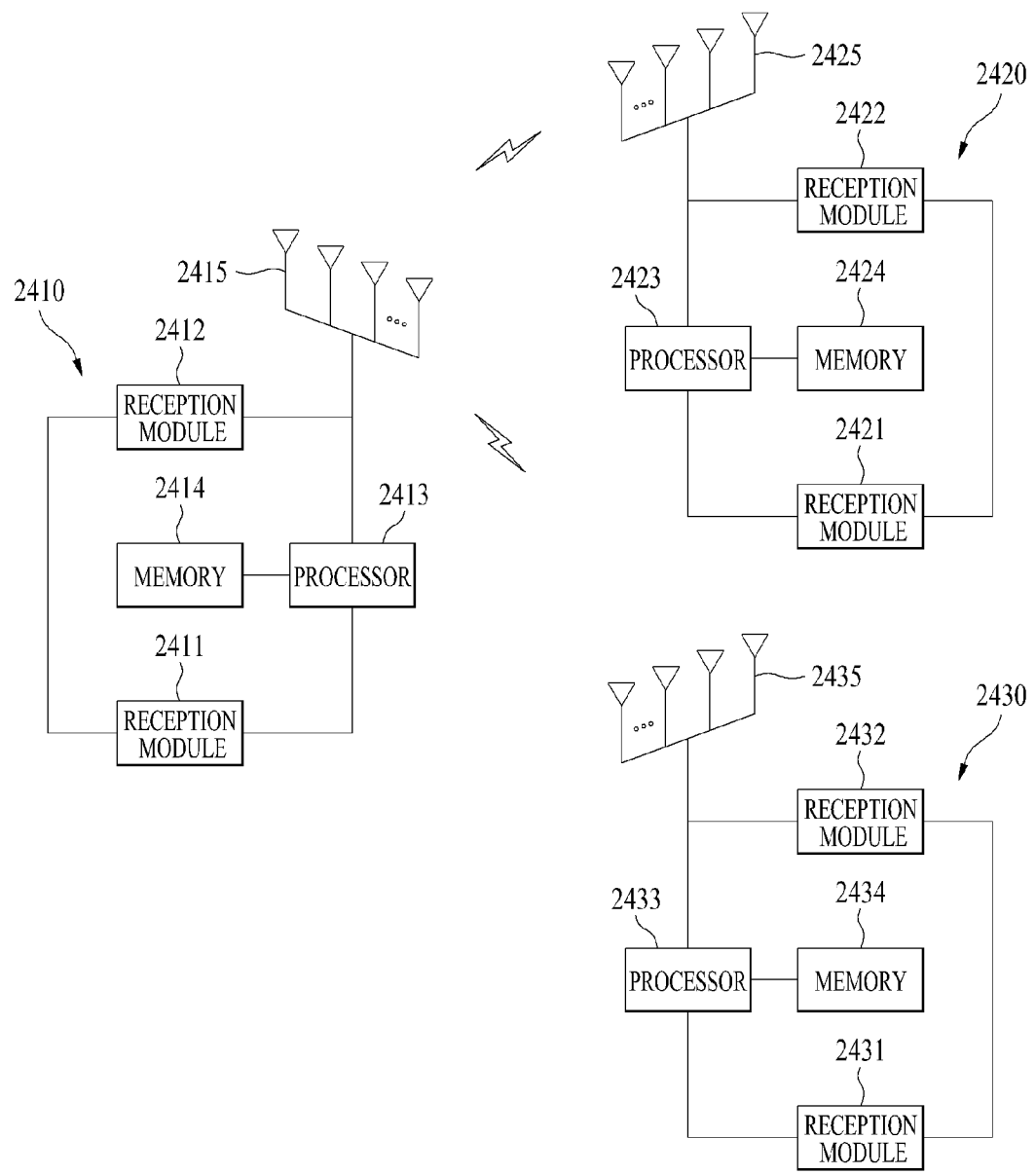
FIG. 24 is a block diagram illustrating a base station and a user equipment according to the embodiment of the present invention.

FIG. 24 is a block diagram illustrating a base station and a user equipment according to the embodiment of the present invention.

Referring to FIG. 24, the user equipment 2410 of the present invention may include reception module 2411, a transmission module 2412, a processor 2413, a memory 2414, and a plurality of antennas 2415. The plurality of antennas 2415 mean the user equipment 2410 that supports MIMO transmission and reception. The reception module 2411 may receive various kinds of signals, data and information on a downlink from the base station. The transmission module 2412 may transmit various kinds of signal, data and information on an uplink to the base station. The processor 2413 may control the overall operation of the user equipment 2410.

The user equipment 2410 according to one embodiment of the present invention may be configured to transmit CSI on multiple base stations. The processor 2413 of the user equipment 2410 may be configured to receive first CSI configuration information on report of CSI, which includes at least one of a rank indicator (RI), precoding matrix indicator (PMI) and channel quality indicator (CQI) of the first base station 2420, through the reception module 2411. Also, the processor 2413 may be configured to receive second CSI configuration information on report of CSI, which includes at least one of RI, PMI and CQI of the second base station 2430, through the reception module 2411. Also, the processor 2413 may be configured to transmit CSI on the first base station 2420 and CSI on the second base station 2430 on the basis of the first CSI configuration information and the second CSI configuration information through the transmission module 2412.

In addition, the processor 2413 of the user equipment 2410 performs an operation for information received by the user equipment 2410, information to be transmitted to the outside, etc., and the memory 2414 may store the operation processed information for a predetermined time and may be replaced with an element such as a buffer (not shown).

Referring to FIG. 24, the first base station 2420 according to the present invention may include a reception module 2421, a transmission module 2422, a processor 2423, a memory 2424, and a plurality of antennas 2425. The plurality of antennas 2425 mean the base station that supports MIMO transmission and reception. The reception module 2421 may receive various kinds of signals, data and information on an uplink from the user equipment 2410, and may receive information between the base stations from another base station 2430. The transmission module 2422 may transmit various kinds of signals, data and information on a downlink to the user equipment 2410, and may transmit information between the base stations to another base station 2430. The processor 2423 may control the overall operation of the base station 2420.

The first base station 2420 according to one embodiment of the present invention may be configured to support CoMP communication. The processor 2423 of the first base station 2420 may be configured to transmit first CSI configuration information on report of CSI, which includes at least one of a rank indicator (RI), precoding matrix indicator (PMI) and channel quality indicator (CQI) of the first base station 2420, through the transmission module 2422. Also, the processor 2423 may be configured to transmit second CSI configuration information on report of CSI, which includes at least one of RI, PMI and CQI of the second base station 2430, through the transmission module 2422. Also, the processor 2423 may be configured to receive CSI on the first base station 2420 and CSI on the second base station 2430 on the basis of the first CSI configuration information and the second CSI configuration information through the reception module 2421.

In addition, the processor 2423 of the first base station 2420 performs an operation for information received by the first base station 2420, information to be transmitted to the outside, etc., and the memory 2424 may store the operation processed information for a predetermined time and may be replaced with an element such as a buffer (not shown).

Referring to FIG. 24, the second base station 2430 according to the present invention may include a reception module 2431, a transmission module 2432, a processor 2433, a memory 2434, and a plurality of antennas 2435. The plurality of antennas 2435 mean the base station that supports MIMO transmission and reception. The reception module 2431 may receive various kinds of signals, data and information on an uplink from the user equipment 2410, and may receive information between the base stations from another base station 2420. The transmission module 2432 may transmit various kinds of signals, data and information on a downlink to the user equipment 2410, and may transmit information between the base stations to another base station 2420. The processor 2433 may control the overall operation of the base station 2430.

The second base station 2430 according to one embodiment of the present invention may be configured to support CoMP communication.

In addition, the processor 2433 of the second base station 2430 performs an operation for information received by the second base station 2430, information to be transmitted to the outside, etc., and the memory 2434 may store the operation processed information for a predetermined time and may be replaced with an element such as a buffer (not shown).

The details of the aforementioned base stations and the aforementioned user equipment may be configured in such a manner that the aforementioned various embodiments of the present invention may independently be applied to the aforementioned base station and the aforementioned user equipment, or two or more embodiments may simultaneously be applied to the aforementioned base station and the aforementioned user equipment, and repeated description will be omitted for clarification.

Also, in the description of FIG. 24, the description of the first base station 2420 and/or the second base station 2430 may equally be a relay station as a downlink transmission entity or an uplink reception entity.

The embodiments according to the present invention may be implemented by various means, for example, hardware, firmware, software, or their combination.

If the embodiments according to the present invention are implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention may be applied to various wireless communication systems.

The invention claimed is:

1. A method for transmitting channel state information (CSI) on multiple base stations in a wireless communication system, the method performed by a user equipment and comprising:
receiving first CSI configuration information on a report of CSI, which includes at least one of a rank indicator (RI), precoding matrix indicator (PMI) and channel quality indicator (CQI) of a first base station;
receiving second CSI configuration information on a report of CSI, which includes at least one of an RI, PMI and CQI of a second base station; and
transmitting CSI on the first base station and CSI on the second base station on the basis of the first CSI configuration information and the second CSI configuration information,
wherein a parameter of part or all of the second CSI configuration information is set to a value equal to a parameter corresponding to the first CSI configuration information, and wherein when a CSI report period and offset parameter of the second CSI configuration information is set to a value equal to a CSI report period and offset parameter of the first CSI configuration information, the CSI on the first base station and the CSI on the second base station are transmitted through one uplink container.

2. The method of claim 1, wherein the parameter set to the value equal to the parameter corresponding to the first CSI configuration information is omitted from the second CSI configuration information.

3. The method of claim 1, wherein the parameter set to the value equal to the parameter corresponding to the first CSI configuration information is a CSI report period.

4. The method of claim 3, wherein the step of transmitting CSI includes alternately transmitting the CSI on the first base station and the CSI on the second base station.

5. The method of claim 3, wherein a transmission time based on a periodic report of the CSI on the first base station and a transmission time based on a periodic report of the CSI on the second base station are set by continuous subframes.

6. The method of claim 3, wherein the step of transmitting CSI includes changing the transmission order of the CSI on the first base station and the CSI on the second base station within the subframe every predetermined subframe group.

7. The method of claim 1, wherein the step of transmitting CSI includes transmitting the CSI on the first base station and CSI on the second base station through a physical uplink control channel (PUCCH) if the RI and PMI of the first base station and the second base station is omitted, and transmitting the CSI on the first base station and CSI on the second base station through a physical uplink shared channel (PUSCH) if not so.

8. The method of claim 1, wherein each of the first CSI configuration information and the second CSI configuration information includes one or more of a CSI report period, offset, subband CSI report period setting parameter, uplink resources used for CSI report, and CSI report mode.

9. The method of claim 1, wherein the first base station is a serving base station, and the second base station is a neighboring base station that may join in coordinated multi point (CoMP) operation.

10. The method of claim 1, wherein the CSI on the first base station is transmitted to the first base station, and the CSI on the second base station is transmitted to any one of the first base station and the second base station.

11. A method for supporting coordinated multi point (CoMP) communication, the method performed by a first base station and comprising:
transmitting first CSI configuration information on a report of CSI, which includes at least one of a rank indicator (RI), precoding matrix indicator (PMI) and channel quality indicator (CQI) of the first base station, to a user equipment;
transmitting second CSI configuration information on a report of CSI, which includes at least one of an RI, PMI and CQI of a second base station, to the user equipment; and
receiving CSI on the first base station and CSI on the second base station on the basis of the first CSI configuration information and the second CSI configuration information from the user equipment,
wherein a parameter of part or all of the second CSI configuration information is set to a value equal to a parameter corresponding to the first CSI configuration information, and
wherein when a CSI report period and offset parameter of the second CSI configuration information is set to a value equal to a CSI report period and offset parameter of the first CSI configuration information, the CSI on the first base station and the CSI on the second base station are transmitted through one uplink container.

12. A user equipment for transmitting channel state information (CSI) on multiple base stations, the user equipment comprising:
a reception module configured to receive a downlink signal from a first base station and a second base station;
a transmission module configured to transmit an uplink signal to the first base station and the second base station; and
a processor configured to:
control the user equipment, which includes the reception module and transmission module,
receive first CSI configuration information on a report of CSI, which includes at least one of a rank indicator (RI), precoding matrix indicator (PMI) and channel quality indicator (CQI) of the first base station, through the reception module,
receive second CSI configuration information on a report of CSI, which includes at least one of an RI, PMI and CQI of the second base station, through the reception module, and
transmit CSI on the first base station and CSI on the second base station on the basis of the first CSI configuration information and the second CSI configuration information, through the transmission module,
wherein a parameter of part or all of the second CSI configuration information is set to a value equal to a parameter corresponding to the first CSI configuration information, and
wherein when a CSI report period and offset parameter of the second CSI configuration information is set to a value equal to a CSI report period and offset parameter of the first CSI configuration information, the CSI on the first base station and the CSI on the second base station are transmitted through one uplink container.

13. A first base station for supporting CoMP communication, the first base station comprising:
a reception module configured to receive an uplink signal from a user equipment and receive information between base stations from a second base station;
a transmission module configured to transmit a downlink signal to the user equipment and transmit information between the base stations to the second base station; and
a processor configured to:
control the first base station, which includes the reception module and transmission module,
transmit first CSI configuration information on a report of CSI, which includes at least one of a rank indicator (RI), precoding matrix indicator (PMI) and channel quality indicator (CQI) of the first base station, through the transmission module,
transmit second CSI configuration information on a report of CSI, which includes at least one of an RI, PMI and CQI of a second base station, through the transmission module, and
receive CSI on the first base station and CSI on the second base station on the basis of the first CSI configuration information and the second CSI configuration information through the reception module,
wherein a parameter of part or all of the second CSI configuration information is set to a value equal to a parameter corresponding to the first CSI configuration information, and wherein when a CSI report period and offset parameter of the second CSI configuration information is set to a value equal to a CSI report period and offset parameter of the first CSI configuration information, the CSI on the first base station and the CSI on the second base station are transmitted through one uplink container.

* * * * *